(12) United States Patent
Verbakel et al.

(10) Patent No.: US 12,496,046 B2
(45) Date of Patent: Dec. 16, 2025

(54) HEMODYNAMIC PARAMETER ESTIMATION

(71) Applicant: KONINKLIJKE PHILIPS N.V., Eindhoven (NL)

(72) Inventors: Frank Verbakel, Helmond (NL); Rohan Joshi, Eindhoven (NL); Sergei Yuryevich Shulepov, Eindhoven (NL); Krishnamoorthy Palanisamy, Bangalore (IN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 18/729,641

(22) PCT Filed: Nov. 30, 2023

(86) PCT No.: PCT/EP2023/083693
§ 371 (c)(1),
(2) Date: Jul. 17, 2024

(87) PCT Pub. No.: WO2024/115640
PCT Pub. Date: Jun. 6, 2024

(65) Prior Publication Data
US 2025/0281159 A1  Sep. 11, 2025

(30) Foreign Application Priority Data

Dec. 2, 2022 (EP) ..................................... 22210995
Dec. 8, 2022 (EP) ..................................... 22212312

(51) Int. Cl.
*A61B 8/00* (2006.01)
*A61B 8/06* (2006.01)
(Continued)

(52) U.S. Cl.
CPC .............. *A61B 8/5223* (2013.01); *A61B 8/06* (2013.01); *A61B 8/488* (2013.01); *A61B 8/5246* (2013.01);
(Continued)

(58) Field of Classification Search
None
See application file for complete search history.

(56) References Cited

U.S. PATENT DOCUMENTS

| 5,997,479 A | 12/1999 | Savord et al. |
| 6,013,032 A | 1/2000 | Savord |

(Continued)

FOREIGN PATENT DOCUMENTS

| WO | 2018177986 A1 | 10/2018 |
| WO | 2021250234 A2 | 12/2021 |

OTHER PUBLICATIONS

International Search Report and Written Opinion for PCT/EP2023/083693; Mailing date: Mar. 4, 2024, 7 pages.
(Continued)

*Primary Examiner* — Jonathan Cwern

(57) ABSTRACT

A method for deriving one or more hemodynamic parameters based on blood-velocity and arterial diameter measures, each sampled recurrently or continuously over a time period to obtain for each a data series spanning a time window (i.e. a waveform). Additionally, a radial blood velocity profile is computed indicative of blood velocity as a function of radial position across a plane cut perpendicularly across the vessel lumen. This gives an indication of how blood velocity varies for the individual patient across the vessel diameter. This information supplements the standard blood-velocity and arterial diameter measures as inputs to a transfer function which maps the inputs to hemodynamic parameters.

15 Claims, 8 Drawing Sheets

(51) Int. Cl.
*G06T 7/00* (2017.01)
*G06T 7/62* (2017.01)

(52) U.S. Cl.
CPC .............. *G06T 7/0016* (2013.01); *G06T 7/62* (2017.01); *G06T 2207/10024* (2013.01); *G06T 2207/10132* (2013.01); *G06T 2207/30104* (2013.01)

(56) References Cited

U.S. PATENT DOCUMENTS

| | | |
|---|---|---|
| 6,283,919 B1 | 9/2001 | Roundhill et al. |
| 6,443,896 B1 | 9/2002 | Detmer |
| 6,458,083 B1 | 10/2002 | Jago et al. |
| 6,530,885 B1 | 3/2003 | Entrekin et al. |
| 6,623,432 B2 | 9/2003 | Powers et al. |
| 2012/0078106 A1 | 3/2012 | Dentinger et al. |
| 2020/0305730 A1 | 10/2020 | Denney, Jr. et al. |
| 2021/0085280 A1 | 3/2021 | Van Heesch |
| 2024/0000415 A1 | 1/2024 | Van Knippenberg et al. |

OTHER PUBLICATIONS

Gupta, A. et al., "Novel Noninvasive Assessment of Pulmonary Arterial Stiffness Using Velocity Transfer Function," J Am Heart Assoc., 2018, vol. 7, Issue 18, 28 pages.

Goddi, A. et al., "Vector Flow Imaging Techniques: An Innovative Ultrasonographic Technique for the Study of Blood Flow," J Clin Ultrasound, 2017, vol. 45, Issue 9, pp. 582-588.

HEMODYNAMIC PARAMETER ESTIMATION

CROSS-REFERENCE TO PRIOR APPLICATIONS

This application is the U.S. National Phase application under 35 U.S.C. § 371 of International Application No. PCT/EP2023/083693, filed on Nov. 30, 2023, which claims the benefit of European Patent Application No. 22210995.1, filed on Dec. 2, 2022, and European Patent Application No. 22212312.7, filed Dec. 8, 2022. These applications are hereby incorporated by reference herein.

FIELD OF THE INVENTION

The present invention relates to hemodynamic parameter estimation using ultrasound data of a blood vessel.

BACKGROUND OF THE INVENTION

Critically ill patients in an intensive care unit (ICU) and patients in an operating room (OR) require monitoring of various physiological parameters. These include routine vital sign monitoring such as: heart rate (HR), respiratory rate (RR), arterial oxygen saturation (SpO2), temperature and often invasive or non-invasive blood pressure (BP) measurements.

In addition, patients often undergo hemodynamic monitoring. Hemodynamic monitoring attempts to measure forces responsible for circulating blood within the body. It is effectively a performance measure of the cardiovascular system. Typical central hemodynamic parameters include cardiac output (CO), stroke volume (SV) and stroke volume variation.

Hemodynamic monitoring is needed for early detection, identification and management of life-threatening clinical conditions such as sepsis and cardiogenic shock, as well as for assessing the efficacy of pharmaceutical interventions such as the administration of vasopressors.

There are a number of different methods for monitoring hemodynamic parameters. By way of example, there will now be described three clinically prevalent methods for monitoring cardiac output.

A first example is the thermodilution approach. This uses the Swan-Ganz pulmonary artery catheter (PAC). It is widely believed to be the most clinically accurate method for assessing central hemodynamics. It is considered the "gold standard" for hemodynamic monitoring of critically ill cardiac patients and is typically the reference measurement against which new technologies are validated and compared. However, despite this, the Swan-Ganz approach still exhibits significant imprecision, with cardiac output measurements varying up to 10-15%.

A second example method, more recently developed, for cardiac output monitoring is the PiCCO (pulse contour cardiac output) system. This is a less invasive alternative to the PAC, owing to the less critical location of the arterial line placement, which can be in the axillary, brachial, femoral or radial artery. The PiCCO approach also requires a central venous catheter. The PiCCO approach is based on continuous cardiac output monitoring using the method of pulse contour analysis. This involves estimating CO and SV using arterial waveform information, along with intermittent trans-pulmonary thermodilution, for calibration purposes. In patients who already have a central arterial line, PiCCO requires only the insertion of an arterial catheter, making it less invasive than the Swan Ganz approach. However, the accuracy of the PiCCO measurement is highly dependent on the underlying changes in the systemic vascular resistance (SVR) and on the time interval since the last calibration point (i.e., point in time since last thermodilution). Sudden changes in the SVR, owing to administration of vasoactive drugs render PiCCO measurements inaccurate. Also over time, owing to gradual autonomic regulation, the SVR can undergo changes. For this reason, intermittent calibration of the PICCO system is needed for obtaining accurate measurements.

As a third example, there exist minimally invasive and non-invasive methods for hemodynamic monitoring. These include the minimally invasive FloTrac® system and the non-invasive ClearSight® system. These each rely on pulse contour analysis but omit calibration. They are therefore less trusted by clinicians. Such systems perform better for tracking trending of hemodynamic parameters than for obtaining absolute measurements.

The FloTrac® approach employs an invasive peripheral arterial line while the Clearsight® approach uses a finger cuff. Typically, the FloTrac® method has better performance than the ClearSight® method.

Major limitations of the more accurate methods of determining hemodynamic parameters include the high invasiveness of the measuring modality-which also carries increased patient risk—and the high level of skill required to insert arterial lines, especially in the case of the PAC. Furthermore, the PAC and the PiCCO approach both require intermittent calibration to obtain accurate measurements. This is problematic when thermodilution is used for calibration because thermodilution cannot be carried out frequently. Some PAC approaches include a heating element to heat small volumes of blood, thereby allowing continuous thermodilution to calibrate the system.

With regard to FloTrac® and ClearSight®, these have low accuracy as they are un-calibrated. This also means that they are not reliable for clinically relevant events such as when fluids or medications are administered, due to expected changes in the SVR which occur.

Thus, classical hemodynamic monitoring approaches are either highly invasive, lack accuracy, or both.

It would be of advantage to identify a non-invasive hemodynamic monitoring method with higher accuracy than existing methods.

SUMMARY OF THE INVENTION

The invention is defined by the independent claims. The dependent claims define advantageous embodiments.

In previous research, the inventors of the present invention found that a combination of ultrasound-acquired parameters related to blood flow in an arterial branch of a subject can be utilized to estimate hemodynamic parameters. This is based on research performed by the inventors which found that the blood velocity waveform as a function of time and arterial diameter waveform as a function of time, acquired and treated as independent signal sources, are well correlated with central hemodynamics. It was found that a statistical or machine learning based model could be used to estimate the central hemodynamics by employing features related to the blood flow parameters measured at an arterial location (e.g. carotid artery). A statistical or machine learning model can be used which embodies a functional or learned relationship between the inputs and the output hemodynamic parameters. This can be based on a supervised learning or training procedure. It may be based on a regression fitting procedure.

A previous approach employed, as inputs to a transfer function, a combination of: a blood velocity-time waveform over at least one heart cycle and an arterial diameter-time waveform over at least one heart cycle. This approach works well in computing central hemodynamic parameters such as stroke volume and cardiac output.

Upon further research, it has been found by the inventors that an improvement can be made by additionally taking account of the variation of blood velocity across the diameter of the vessel. For this purpose, it is proposed by the inventors to additionally acquire Color Doppler data and derive from this a radial velocity profile across an artery at a measurement location, and use one or more features of this profile as one or more additional inputs to the transfer function.

Accordingly, an aspect of the invention provides a computer-implemented method for deriving one or more hemodynamic parameters of a subject. The method comprises receiving 2D ultrasound data from a blood vessel (e.g. artery) of the subject, wherein said 2D ultrasound data includes B-Mode data, pulsed wave Doppler data and Color Doppler data.

The method further comprises deriving, using the received Color Doppler data, a radial velocity profile for the blood vessel, the radial velocity profile corresponding to blood velocity as a function of radial position across a radial axis of the blood vessel at a measurement location. By radial axis is meant for example a radial axis of a (cross-sectional) plane oriented normal with respect to a longitudinal/axial axis of the artery at the measurement location. The radial axis for example extends from a center point of such a plane to its outer perimeter (i.e. to the wall of the artery). The radial axis is sometimes referred to as the short axis of the artery, and the longitudinal axis is sometimes referred to as the long axis of the artery.

The method further comprises deriving from the received 2D ultrasound data a blood velocity-time waveform representative of blood velocity at the measurement location of the blood vessel (as a function of time) over a time window.

The method further comprises deriving from the received 2D ultrasound data an arterial diameter waveform representative of a diameter of said at least one blood vessel, or a parameter proportional thereto (as a function of time), at the measurement location over the time window.

The method further comprises computing a first set of parameters, including: computing from the radial velocity profile one or more pre-defined velocity profile parameters, wherein computing the one or more pre-defined velocity profile parameters includes computing at least a skewness of the velocity profile, computing from the blood velocity waveform a pre-defined blood velocity parameter, and computing from the arterial diameter waveform a pre-defined arterial diameter parameter. The parameters may be features of the respective waveforms for example. The parameters might be statistical parameters in some examples. Skewness reflects asymmetry of the waveform shape, as does radial location of the velocity maximum.

The method further comprises retrieving a pre-defined transfer function configured to receive said first set of parameters as inputs and to generate the one or more hemodynamic parameters as output.

The method further comprises processing the first set of parameters with the transfer function to derive values for the one or more hemodynamic parameters.

The method may further comprise generating a data output reflective of the one or more hemodynamic parameters.

'Hemodynamic parameters' may for example mean central hemodynamic parameters, e.g. cardiac output, stroke volume, stroke volume variation. In some embodiments, the one or more hemodynamic parameters may include a fluid responsiveness measure.

Thus, embodiments of the invention are based on utilizing a combination of ultrasound-acquired parameters related to blood flow in an arterial branch of a subject in order to estimate hemodynamic parameters. It is proposed moreover to measure a radial velocity profile for the artery, meaning a blood velocity as a function of position across the artery radius or diameter of the lumen. Blood velocity is not constant across the artery diameter. As will be explained in more detail later, it is often assumed that the radial velocity profile is close to parabolic over the entire cardiac cycle. Due to pulsatility, the blood flow may slightly deviate from the parabolic shape, and a fixed correction factor is typically employed to estimate the flow. From the literature, a population average for this factor is about 5.6-5.8. However, this is based on an idealized geometry for the artery. For any given patient however, blood vessel geometry may deviate from a straight shape, meaning that flow will not be strictly parabolic even at low pulsatility (low Womersley number). Accordingly, measuring and taking into account the radial velocity profile when computing hemodynamic parameters adds accuracy. Therefore, computing the velocity profile in the artery will add accuracy. The radial velocity profile may vary in time depending on the velocity-time waveform, and may have shapes significantly deviating from the standard parabolic profile. This will be explained in greater detail to follow.

In some embodiments, deriving the radial velocity profile may comprise: receiving color doppler data spanning a scan plane oriented at an oblique angle with respect to a longitudinal axis of the blood vessel; deriving a first blood velocity profile as a function of position across said scan plane; and computing a projection of the first blood velocity profile to a plane normal to a longitudinal axis of the blood vessel and parallel with a radial axis of the blood vessel, to thereby derive the radial velocity profile corresponding to blood velocity as a function of radial position across a radial axis. Doppler ultrasound data must be acquired at an angle to the direction of flow, otherwise a zero-velocity measurement is obtained (no Doppler shift). This yields in the first instance velocity data as a function of radial position across the angled scan plane. This may then be projected onto a plane perpendicular to the direction of flow (i.e. normal to the artery longitudinal axis).

In some embodiments, computing the one or more pre-defined velocity profile parameters further includes computing one or more of: (i) radial location of a velocity maximum of the velocity profile, for example with respect to the geometrical center of the artery, (ii) an area-under-curve of the velocity profile, or under one or more pre-defined sections of the curve (e.g. a first and second half). The general concept is to derive parameters which are directly or indirectly reflective of a deviation of the velocity profile shape from a parabolic shape.

In some embodiments, the method comprises deriving a radial velocity profile for a series of time points over the time window, to thereby derive a radial velocity profile as a function of time.

In some embodiments, computing the one or more pre-defined velocity profile parameters includes computing a standard deviation of the radial velocity profile over the time window for each time point (each frame). This means taking a standard deviation of the velocity values of the velocity profile at each time point. In some embodiments, an average of these standard deviation values may be taken over all of the time points.

An aim here is to quantitatively capture changes in the velocity profile over time by assessing the standard deviation of the velocity profile for each frame. This approach may capture turbulent blood flow, including due to arrhythmias.

In some embodiments, the aforementioned time window includes a systole phase and a diastole phase of the heart cycle of the subject. In some embodiments, the computing the one or more pre-defined velocity profile parameters includes computing a difference between the velocity profile at a time point within the systole phase and the velocity profile at a time point within the diastole phase. In some embodiments, at least one of the one or more pre-defined velocity profile parameters may represent a deviation of at least one feature of the velocity profile from a parabolic velocity function.

In some embodiments, computing at least one of the one or more pre-defined velocity profile parameters comprises: extracting a feature from the velocity profile and computing a deviation of the extracted feature from a corresponding feature of a parabolic velocity function.

The various proposed features outlined above provide patient-specific information and characterize curvature and overall lumen shape. Including one or more of these parameters as inputs to the transfer function provides an improvement to accuracy of hemodynamic parameter estimation.

In some embodiments, the blood velocity parameter comprises at least one of: an interdecile range of the velocity-time waveform over the time window; a mean value of blood velocity over the time window; a mean value of peak systolic velocity over the time window; a mean value of the blood velocity over the time window, normalized by a number of heart cycles spanned by the time window; and an integral of the velocity-time waveform with respect to time over the time window, normalized by the number of heart cycles spanned by the time window.

In some embodiments, the arterial diameter parameter comprises at least one of: a mean value of the arterial diameter over the time window; and a mean value of a cross-sectional area of the at least one blood vessel over the time window.

In some embodiments, the one or more hemodynamic parameters may include one or more of: cardiac output, stroke volume, and stroke volume variation.

In some embodiments, the time window spans at least one heart-cycle, and preferably spans a plurality of heart cycles.

In some embodiments, the transfer function is a machine learning model.

In some embodiments, the transfer function is a multi-parametric linear regression model.

The invention can also be embodied in software form. Another aspect of the invention is a computer program product comprising computer readable code, the computer readable code being configured such that, on execution by a suitable computer or processor, the computer or processor is caused to perform a method in accordance with any of the embodiments outlined in this document.

Another aspect of the invention is a computer readable medium, the computer readable medium having computer readable code embodied therein, the computer readable code being configured such that, on execution by a suitable computer or processor, the computer or processor is caused to perform a method in accordance with any of the embodiments outlined in this document.

The invention can also be embodied in hardware. Thus, another aspect of the invention is a processing device comprising: an input/output; and one or more processors, adapted to: receive 2D ultrasound data from a blood vessel of the subject, wherein said 2D ultrasound data includes B-Mode data, pulsed wave Doppler data and Color Doppler data; derive using the received Color Doppler data a radial velocity profile for the blood vessel, the radial velocity profile corresponding to blood velocity as a function of position across a radial axis of the blood vessel at a measurement location; derive from the received 2D ultrasound data a blood velocity-time waveform representative of blood velocity at the measurement location of the blood vessel over a time window; derive from the received 2D ultrasound data an arterial diameter waveform representative of a diameter of said at least one blood vessel, or a parameter proportional thereto, at the measurement location over the time window.

The one or more processors are further adapted to compute a first set of parameters, including: computing from the radial velocity profile one or more pre-defined velocity profile parameters, computing from the blood velocity waveform a pre-defined blood velocity parameter, and computing from the arterial diameter waveform a pre-defined arterial diameter parameter.

The one or more processors are further adapted to retrieve a pre-defined transfer function configured to receive said first set of parameters as inputs and to generate the one or more hemodynamic parameters as output; process the first set of parameters with the transfer function to derive values for the one or more hemodynamic parameters; and preferably generate a data output reflective of the one or more hemodynamic parameters.

Another aspect of the invention is a system comprising the processing device as set out above or in accordance with any embodiment detailed in this document; and an ultrasound scanning apparatus comprising at least one transducer unit for acquiring ultrasound echo signal data of the at least one blood vessel of the subject, and a processing unit for processing the echo data to derive B-Mode data, pulsed wave Doppler data and Color Doppler data. The input/output of the processing arrangement may be operatively coupled with an output of the ultrasound scanning apparatus for receiving the B-Mode data, pulsed wave Doppler data and Color Doppler data.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
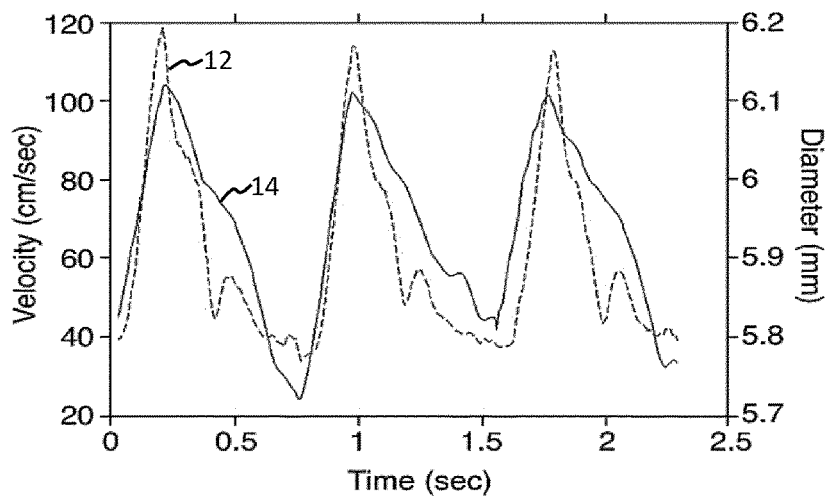
FIG. 1 illustrates an example blood velocity-time waveform and diameter-time waveform.

The invention will be described with reference to the figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the figures are merely schematic and are not drawn to scale. It should also be understood that the same reference numerals are used throughout the figures to indicate the same or similar parts.

The invention provides a method for deriving one or more hemodynamic parameters based on blood-velocity and arterial diameter measures, each sampled recurrently or continuously over a time period to obtain for each a data series spanning a time window (i.e. a waveform). Additionally, a radial blood velocity profile is computed indicative of blood velocity as a function of radial position across a plane cut perpendicularly across the vessel lumen. This gives an indication of how blood velocity varies for the individual patient across the vessel diameter. This information supplements the standard blood-velocity and arterial diameter measures as inputs to a transfer function which maps the inputs to hemodynamic parameters.

At least one aim is to estimate hemodynamic parameters such as cardiac output and stroke volume based on ultrasound measurements performed on a blood vessel, e.g., an artery, e.g., the carotid artery. It is also possible to use other vital signs and patient demographics as inputs into the transfer function. From 2D ultrasound data (e.g., pulsed wave doppler and B-mode) it is possible to calculate the velocity in time at a single measurement point (velocity-time waveform) and arterial diameter in time at the measurement point (diameter-time waveform). By way of illustration, FIG. 1 shows a typical velocity-time waveform 12 and diameter-time waveform 14. Velocity is shown on the left-hand y-axis (units: cm/sec) and diameter is shown in the right-hand y-axis (units: mm). Time is indexed on the x-axis (units: seconds).

It is often assumed that the radial/diametric velocity profile in a common carotid artery (CCA) at a location far from arterial bifurcation (about 1.5 cm and further below) is close to parabolic over the entire cardiac cycle. Due to pulsatility, the blood flow may slightly deviate from the parabolic shape, and a fixed correction factor is typically employed to estimate the flow. From the literature, a population average Figure of about 5.6-5.8 is cited, and may depend on the particular method by which flow is extracted from measurements.

In a large group of patients however, CCA geometry may deviate from a straight shape. Consequently, flow will not be strictly parabolic even at low pulsatility (low Womersley number). In engineering, this effect is known as a Dean flow, and deviation of the flow from parabolic is characterized by the Dean number ($De=Re\cdot(d/2Rc)$), where Re is the Reynolds number, d is the artery diameter, and Rc is the artery curvature. Therefore, further to the velocity-time waveform at a single measurement point, radial velocity profile in the artery provides valuable additional information. This velocity profile may vary in time depending on the velocity-time waveform, and may have shapes significantly deviating from a simple parabolic profile.

Figure 2:
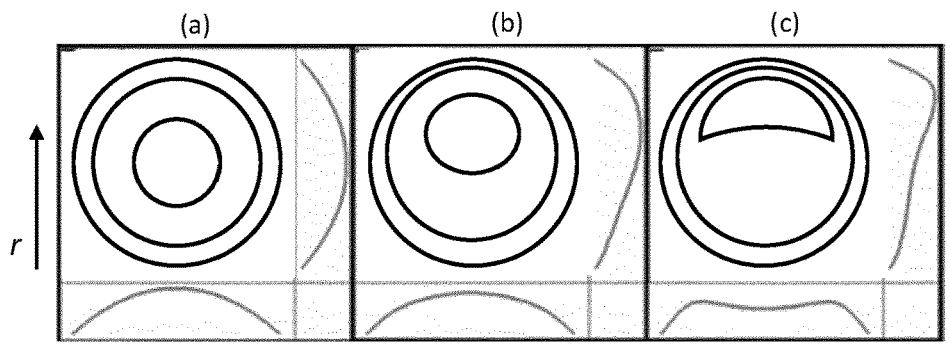
FIG. 2 illustrates example radial velocity profiles across a cross-section of an artery.

FIG. 2 schematically illustrates some same radial velocity profile shapes, illustrated in the form of rough contour maps. The radial direction, r, is indicated. Example (a) shows a standard parabolic profile. Example (b) illustrates a non-parabolic profile, wherein the velocity maximum is offset from the artery center point, so that the overall velocity profile is skewed. Example (c) shows a non-parabolic profile in which the velocity maximum is also offset from the center, and wherein the gradient lines are distorted to an irregular, non-symmetric gradient profile.

Figure 3:
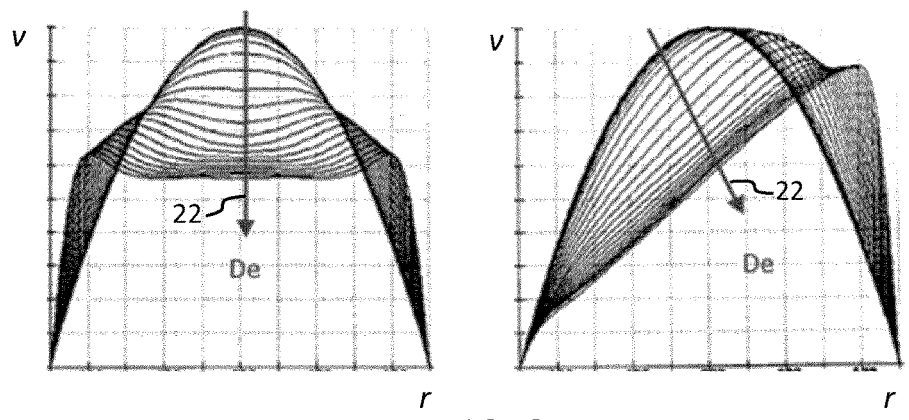
FIG. 3 illustrates a relationship between radial velocity profile and Dean number.

FIG. 3 provides an indicative illustration of how the velocity profiles deviate as a function of Dean number. Each graph shows a respective plurality of radial velocity profiles. In each graph, the y-axis represents velocity, and the x-axis represents radial position across the artery, scaled to the vessel radius, with zero at the centerline. Thus, each individual line or waveform in each graph is a single respective radial velocity profile. The arrow 22 in each graph shows the direction of increasing dean number. It can therefore be seen how the radial profile shape changes as Dean number increases.

In literature, often a population average correction factor is used to derive the beat-to-beat flow. However, volunteer studies performed by the inventors have shown that the flow correction factor may significantly differ from patient to patient, with typical range of 0.55 to 0.67, based on the average blood flow.

Figure 4:
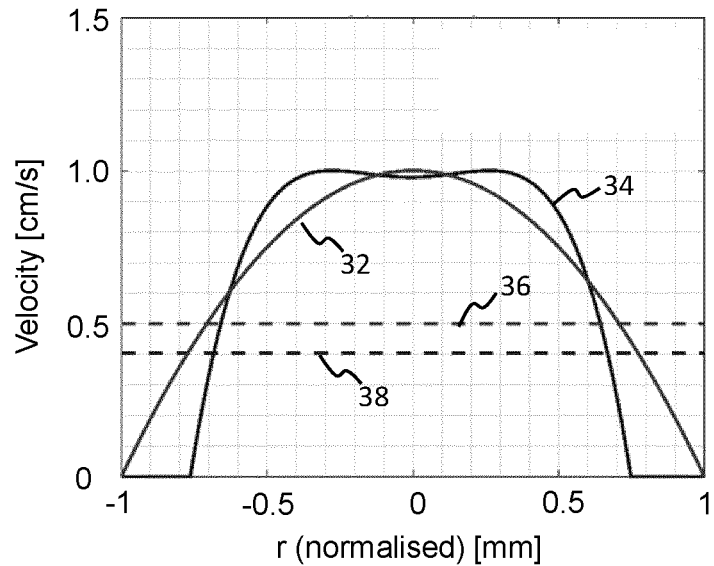
FIG. 4 illustrates a comparison between an example radial velocity profile for a blood vessel with moderate pulsatility as compared with an ideal parabolic velocity profile.

By way of illustration, FIG. 4 shows an example radial velocity profile. The y-axis shows velocity (m/s) and x-axis shows radial position (normalized fraction of total radius). Line 32 shows a standard parabolic radial velocity profile. Line 34 shows an example radial velocity profile corresponding to an artery where flow has Womersley number of 3. Line 36 illustrates average velocity over the whole cardiac cycle for the parabolic 32 profile. Line 38 illustrates average velocity over the whole cardiac cycle for the artery with Womersley number 3.

Table 1 below shows examples of different correction factors (correction to account for deviation from parabolic radial velocity profile) for a set of five different patients, and for flow measured for each patient at six time points. The time difference between the acquisitions varies from 5 to 10 minutes.

TABLE 1 velocity profile correction factors for patients 1-5 at time points 1-6.

|        | Patient 1 | Patient 2 | Patient 3 | Patient 4 | Patient 5 |
|--------|-----------|-----------|-----------|-----------|-----------|
| Time 1 | 0.67      | 0.59      | 0.59      | 0.62      | 0.59      |
| Time 2 | 0.58      | 0.62      | 0.61      | 0.54      | 0.61      |
| Time 3 | 0.65      | 0.59      | 0.57      | 0.60      | 0.57      |
| Time 4 | 0.68      | 0.58      | 0.60      | 0.55      | 0.60      |
| Time 5 | 0.67      | 0.59      | 0.57      | 0.57      | 0.57      |
| Time 6 | 0.61      | 0.60      | 0.57      | 0.57      | 0.57      |
| AVG    | 0.64      | 0.595     | 0.585     | 0.575     | 0.585     |

It can readily be seen that the correction factor varies significantly between different patients and also for a same patient at different time points. Thus, use of a single average correction factor can be expected to lead to some inaccuracy.

Figure 5:
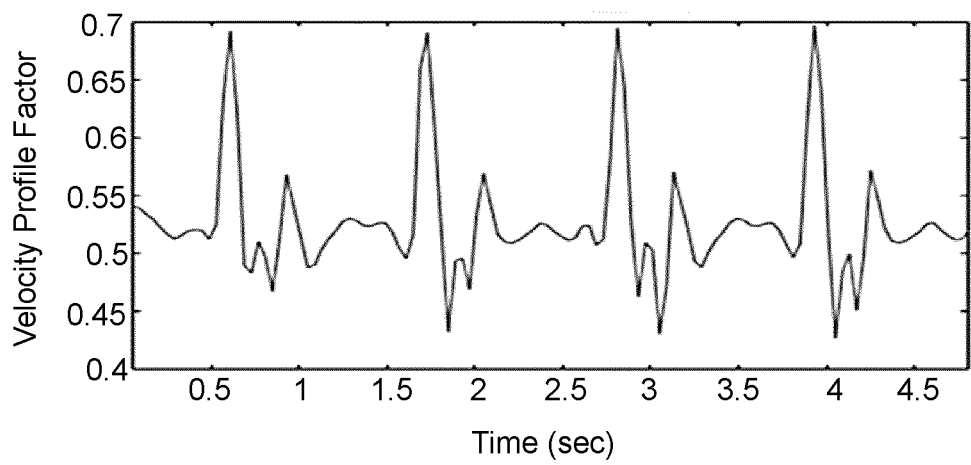
FIG. 5 shows an example variation for a single patient of velocity profile correction factor (y-axis) as a function of time (x-axis; seconds)

Furthermore, the patient specific, instantaneous correction factor based on the velocity waveform may vary between 0.45 to 0.7, as shown in example of FIG. 5 which shows, for a single example patient, a velocity profile correction factor (y-axis) as a function of time (x-axis; seconds). The instantaneous velocity profile correction factor indicates how far the measured radial velocity profile deviates from a standard parabolic velocity profile.

The above considerations suggest that a transfer function for mapping arterial flow parameters to hemodynamic parameters would be made more accurate if it were to take into account the radial velocity profile of the patient.

Figure 6:
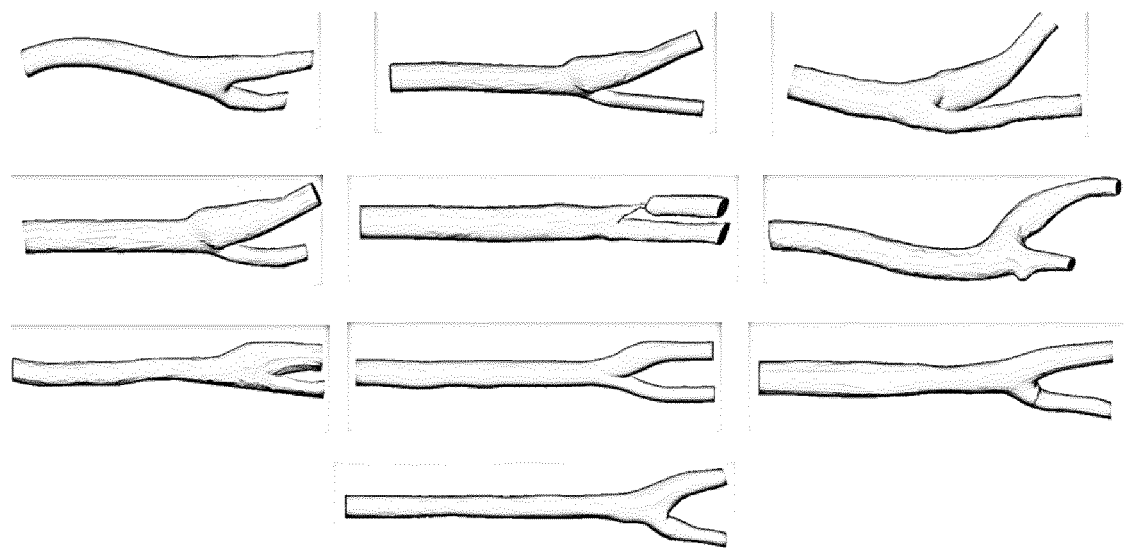
FIG. 6 shows example blood vessel morphologies.

Further to the above, not just pulsatility but also vessel morphology may contribute significantly to the deviation of an individual's arterial flow from a standard parabolic radial velocity profile. For illustration, FIG. 6 shows differing morphologies of the common carotid artery for a set of different patients. As mentioned above, in known approaches, correction of the flow or velocity profile due to pulsatility is usually taken into account based on the Womersley number. This can be done using different approaches, such as average correction factor, piecewise correction (for systole and diastole phase), and finally, using instantaneous, inverse Womersley reconstructions.

However, deviations caused by local or global artery shape are usually not accounted for but can cause significant departure of the velocity profiles from a parabolic shape. For example, a non-straight common carotid artery (CCA) velocity profile will vary at different locations in a single patient, and therefore any computations which depend upon the velocity profile may vary in accuracy at different measurement locations if account is not made for this variable feature.

Stenosis and calcification can also lead to variation in the radial velocity profile.

In addition, vessel tortuosity (i.e., degree of non-linearity of the vessel) can lead to variation in the radial velocity profile as a function of location along the vessel. Tortuosity tends to increase with patient age.

Figure 7A:
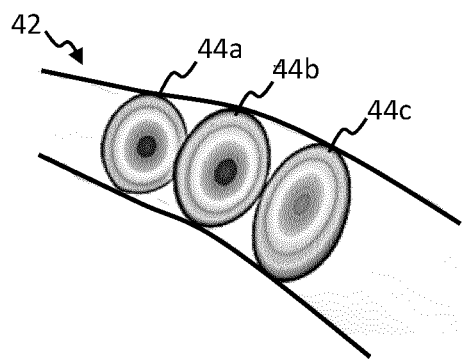
FIG. 7A illustrates radial velocity profiles along a blood vessel which is relatively straight.

For example, FIG. 7A illustrates an example blood vessel 42 which is relatively straight (low tortuosity). Three sample radial velocity profiles 44a, 44b, 44c along a portion of this vessel are shown. All are roughly similar to one another and all roughly approximate a parabolic velocity profile.

Figure 7B:
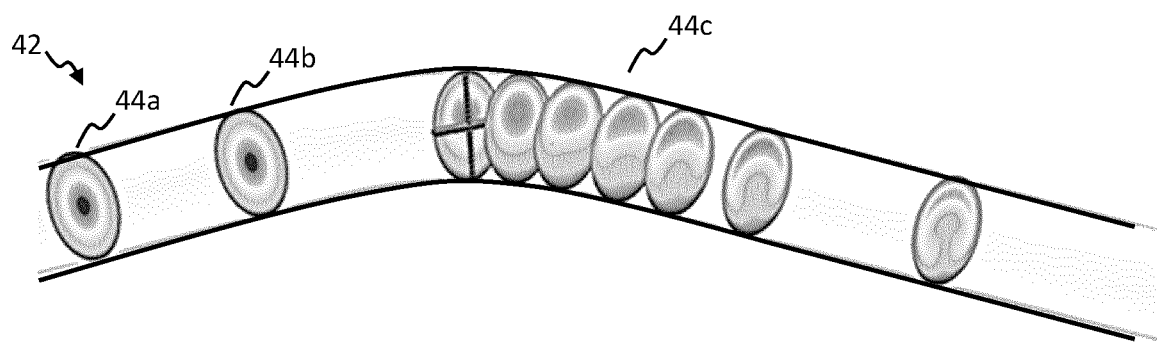
FIG. 7B illustrates radial velocity profiles along a blood vessel which is non-straight.
Figure 8A:
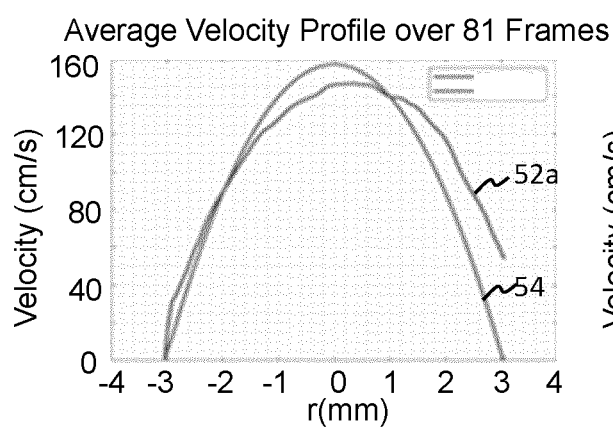
FIG. 8 shows a set of example radial velocity profiles at different points along a tortuous blood vessel.
Figure 8B:
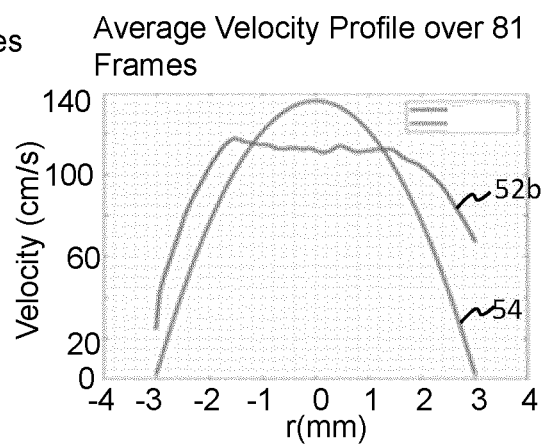
Figure 8C:
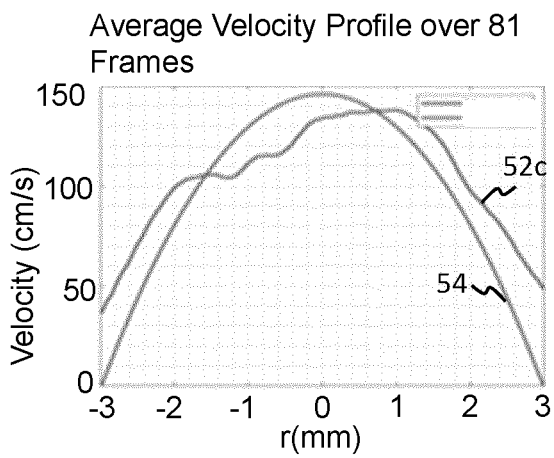
Figure 8D:
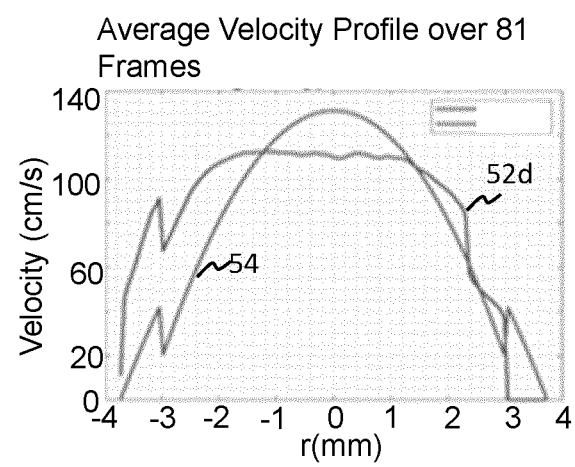

By way of comparison, FIG. 7B shows an example blood vessel 42 which changes direction at a bend point, and thus has higher tortuosity. Two example radial velocity profiles 44a, 44b upstream of the bending points show fairly similar profile shapes and approximately match a parabolic velocity profile. Also shown are a set 44c of radial velocity profiles downstream of the bending point. It can be seen that these profiles differ from one another and also are distorted compared to the standard parabolic velocity profile. Thus, it can be recognized that the velocity profile strongly varies depending on the up- and down-stream morphology.

To show this more clearly, FIG. 8 shows a series of graphs indicating the radial velocity profile 52 at different locations along a tortuous vessel as compared with a parabolic velocity profile 54. The y-axis shows velocity (m/s) and x-axis shows radial position across the artery cross-section measured from the artery center point. FIG. 8a shows a velocity profile 52a for an arterial section which has a straight inflow path and straight outflow path. The profile is fairly similar to the parabolic profile 54. FIG. 8b shows a velocity profile 52b for an arterial section which has an inflow at a small horizontal angle and a straight outflow. FIG. 8c shows a velocity profile 52c for an arterial section which has a straight inflow path and an outflow path at a small horizontal axis. FIG. 8d shows a velocity profile 52d which has an inflow at a small horizontal angle and an outflow at a small horizontal angle. It can seen that the velocity profiles with non-straight inflow and/or outflow have radial velocity profiles which deviate to a greater degree from a parabolic velocity profile 54.

Following from the above observations, it is the proposal of the inventors associated with the present application to acquire Doppler data across the radial cross section of the blood vessel during the cardiac cycle and obtain blood velocity measurements at different radial positions across the vessel radial cross-section, to thereby derive a radial blood velocity profile. It is proposed to use features extracted from this profile as additional inputs to a transfer function configured for mapping various vessel flow/geometry inputs to hemodynamic parameter outputs.

Figure 9:
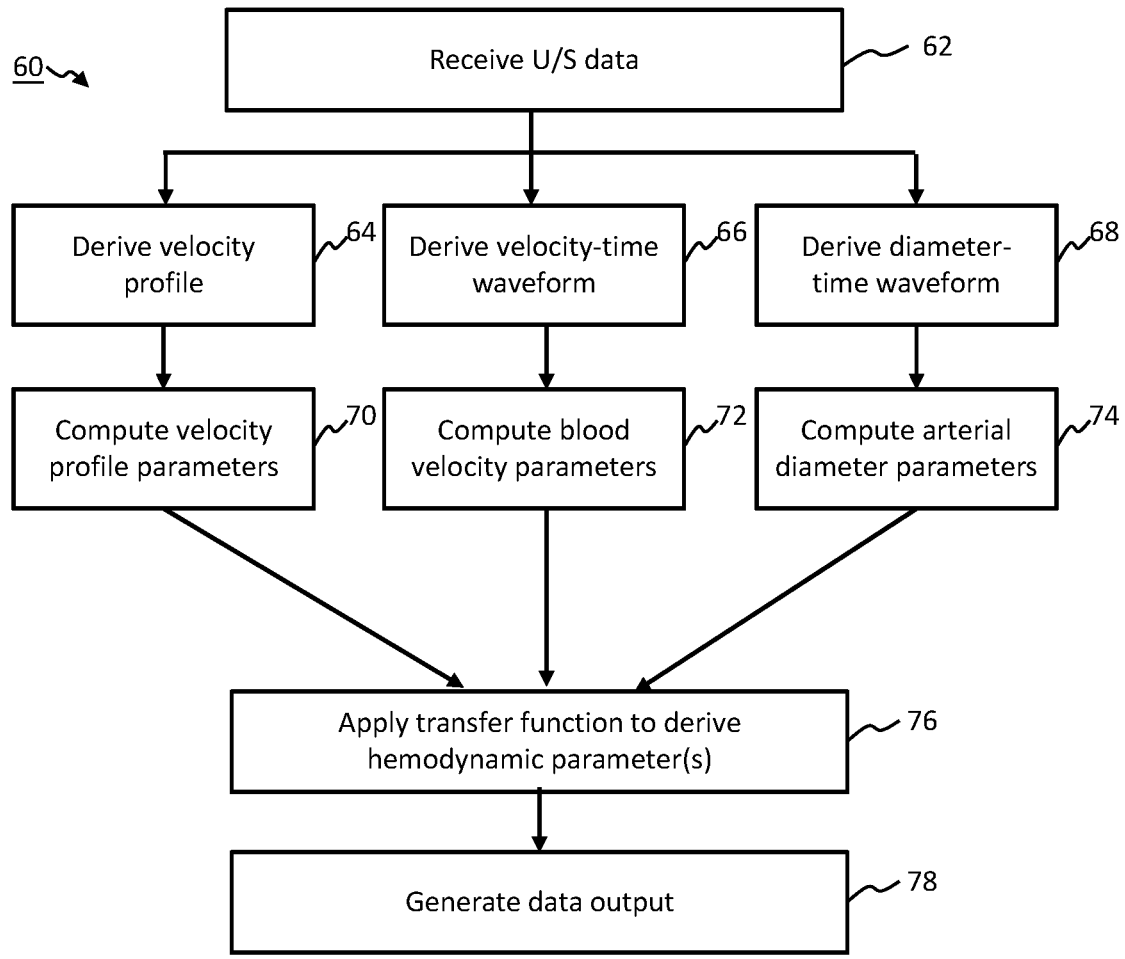
FIG. 9 outlines steps of an example method in accordance with one or more embodiments of the invention.

FIG. 9 outlines in block diagram form steps of an example computer implemented method 60 according to one or more embodiments. The steps will be recited in summary, before being explained further in the form of example embodiments.

The method 60 is for deriving one or more hemodynamic parameters of a subject.

The method comprises receiving 62 2D ultrasound data ("U/S data") from a blood vessel (e.g., artery) of the subject, wherein said 2D ultrasound data includes B-Mode data, pulsed wave Doppler data and Color Doppler data.

The method further comprises deriving 64, using the received Color Doppler data, a radial velocity profile for the blood vessel, the radial velocity profile corresponding to blood velocity as a function of radial position across a radial axis of the blood vessel at a measurement location. By radial axis is meant for example a radial axis of a (cross-sectional) plane oriented normal with respect to a longitudinal/axial axis of the artery at the measurement location. The radial axis for example extends from a center point of such a plane to its outer perimeter (i.e., to the wall of the artery). The radial axis is sometimes referred to as the short axis of the artery, and the longitudinal axis is sometimes referred to as the long axis of the artery.

The method further comprises deriving 66 from the received 2D ultrasound data a blood velocity-time waveform representative of blood velocity at the measurement location of the blood vessel (as a function of time) over a time window. The time window preferably spans at least one complete cardiac cycle, for example a plurality of cardiac cycles. This may be derived from the Pulse Wave Doppler (PWD) data. The blood velocity waveform may be represented by a data series of blood velocity measurement samples for the measurement location, at regular time intervals over the time window. Pulse wave doppler data is acquired for a single measurement location, defined according to a gate setting of the acquisition apparatus.

The method further comprises deriving 68 from the received 2D ultrasound data an arterial diameter waveform representative of a diameter of said at least one blood vessel, or a parameter proportional thereto (as a function of time), at the measurement location over the time window. This may be derived from processing of the B-mode data. Extracting the diameter measurement may be based on an automated segmentation algorithm or based on another image processing algorithm. The skilled person in this field will be aware of suitable technical means for extracting the diameter measurement from the 2D ultrasound data.

The method further comprises computing a first set of parameters, including: computing 70 from the radial velocity profile one or more pre-defined velocity profile parameters, computing 72 from the blood velocity waveform a pre-defined blood velocity parameter, and computing 74 from the arterial diameter waveform a pre-defined arterial diameter parameter. The parameters may be features of the respective waveforms for example. The parameters might be statistical parameters in some examples.

The method further comprises retrieving a pre-defined transfer function configured to receive said first set of parameters as inputs and to generate the one or more hemodynamic parameters as output. The method further comprises processing 76 the first set of parameters with the transfer function to derive values for the one or more hemodynamic parameters.

The method may further comprise generating a data output 78 reflective of the one or more hemodynamic parameters. This may be communicated to a user interface in some examples, e.g., a patient monitor system. It may be displayed using a display device. It may be communicated to a data storage unit for later retrieval. It may be communicated to a remote computer or remote datastore via a network or Internet link.

As noted above, the method 60 can also be embodied in hardware form, for example in the form of a processing unit or device which is configured to carry out a method in accordance with any example or embodiment described in this document, or in accordance with any claim of this application.

Figure 10:
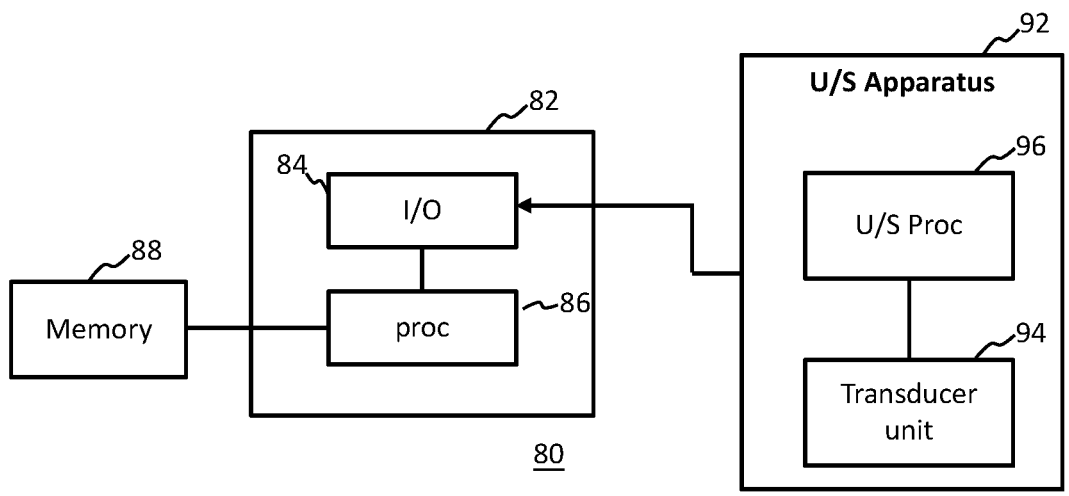
FIG. 10 outlines components of an example processing device and system in accordance with one or more embodiments of the invention.

To further aid understanding, FIG. 10 presents a schematic representation of an example processing device 82 configured to execute a method in accordance with one or more embodiments of the invention. The processing device is shown in the context of a system 80 which comprises the processing device. The processing device alone represents an aspect of the invention. The system 80 is another aspect of the invention. The provided system does not have to comprise all of the illustrated hardware components; it may just comprise a subset of them.

The processing device comprises one or more processors 86 configured to perform a method in accordance with that outlined above, or in accordance with any embodiment described in this document or any claim of this application. In the illustrated example, the processing unit further comprises a communication interface or an input/output 84.

In the illustrated example of FIG. 10, the system 80 further comprises an ultrasound scanning apparatus 92 comprising at least one transducer unit 94 for acquiring ultrasound echo signal data of the at least one blood vessel of the subject, and a processing unit 96 for processing the echo data to derive B-Mode data, pulsed wave Doppler data and Color Doppler data. Methods for performing such processing are described in more detail later with reference to FIG. 15. In some embodiments, the transducer unit may comprise an ultrasound probe. In some embodiments, the transducer unit comprise a wearable ultrasound patch which comprises an ultrasound transducer array integrated in a patch which is adherable to a surface of a patient's body for monitoring purposes. For example, the patch can be applied above a blood vessel of interest, e.g., the common carotid artery.

Of course, it is not essential that the system comprise all of the above-mentioned hardware components. A system in accordance with the invention can be provided which comprises none or only one or more of these components.

The system 80 may further comprise a memory 88 for storing computer program code (e.g., computer-executable code or instructions) which is configured for causing the one or more processors 86 of the processing unit 82 to perform the method as outlined above, or in accordance with any embodiment described in this disclosure, or in accordance with any claim.

As mentioned previously, the invention can also be embodied in software form. Thus another aspect of the invention is a computer program product comprising code configured, when run on a processor, to cause the processor to perform a method in accordance with any example or embodiment of the invention described in this document, or in accordance with any claim of this patent application.

While pulsed wave Doppler (PWD) data can yield blood velocity information at a high temporal resolution, it can acquire measurements for only a single sample volume in the artery, which is typically small compared to the diameter of the artery.

Color Doppler by contrast can be used to obtain velocity measurements at sample points spanning the entire lumen of the artery (across the entire radial axis, e.g., across the whole radius or across the whole diameter), thereby providing a velocity profile. It is noted that in this disclosure two-dimensional (2D) Color Doppler is envisaged. By extracting specific feature(s) from this velocity profile, the transfer function can be supplemented with information which is directly or indirectly indicative of deviations from parabolic flow profiles. This is unique spatial information about the flow through the artery, not available from PWD and B-mode data, and which can improve the transfer function performance. This provides significant improvement, particularly in the case of non-straight arteries. Non-straight arterial paths can be present both as a natural anatomical feature, and also due to plaque formations such as arteriosclerosis.

The method may also find particular advantage for patients with arrhythmia. During arrhythmias, instead of coordinated contractions of the heart, a quivering action is often observed, alongside inadequate filling of the heart which can lead to irregular blood flow. Thus, the blood flow behavior demonstrates higher pulsatility (although with lower peak flow rates).

Figure 11:
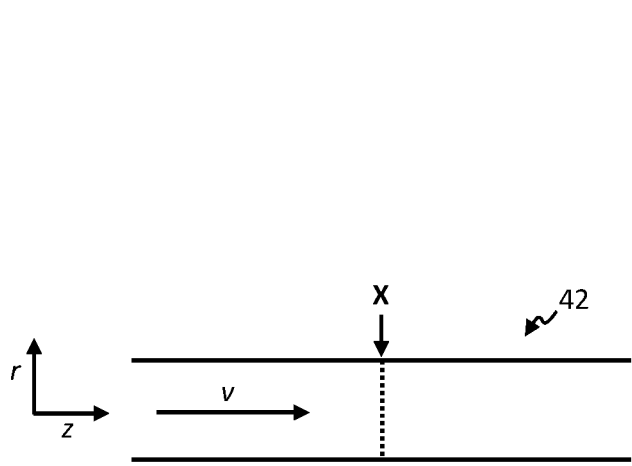
FIG. 11 schematically illustrates the geometry of an example blood vessel.
Figure 12:
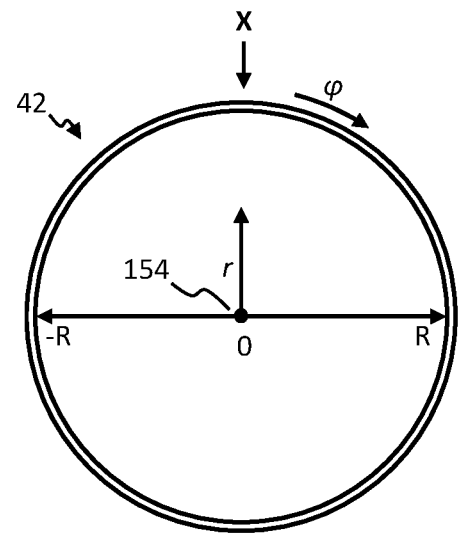
FIG. 12 schematically illustrates a radial cross-section of an example blood vessel.

FIG. 11 schematically shows a blood vessel 42 with blood flow along a longitudinal axis, z, of the vessel. A direction, r, of a radial axis of the vessel is shown. The blood flow has velocity, v, along the longitudinal direction, z, of the vessel. FIG. 12 shows a radial cross-section along line X indicated in FIG. 11. The radial, r, and circumferential, φ, axis directions are shown. The vessel 42 lumen in this schematic illustration has a total radius, R, and a diameter 2R. The radial dimension may be measured from a center point 154 of the vessel lumen, so that the lumen diameter extends from a radial position −R at one side to +R at the other side.

As outlined above, embodiments of the invention involve obtaining a radial velocity profile for the blood vessel, the radial velocity profile corresponding to blood velocity as a function of radial position across a radial axis, r, of the blood vessel at a measurement location. The measurement location in this case means at a location along the longitudinal axis of the blood vessel, meaning the axis co-directional with blood flow. The measurement location for example might be taken to be location X as indicated in FIG. 11, so that a radial velocity profile is obtained indicative of blood velocity in the longitudinal direction, z, as a function of radial position along the radial axis, r, of the vessel.

As mentioned above, it is proposed in at least some embodiments to obtain the radial velocity profile from Color Doppler data. Color Doppler data may be acquired using an ultrasound scanning apparatus at location X.

Preferably, Doppler ultrasound data is acquired at an angle to the direction of blood flow, otherwise a zero-velocity measurement is obtained (no Doppler shift). This yields in the first instance velocity data as a function of radial position across the angled scan plane. This may then be projected onto a plane perpendicular to the direction of flow (i.e., normal to the artery longitudinal axis).

Figure 13:
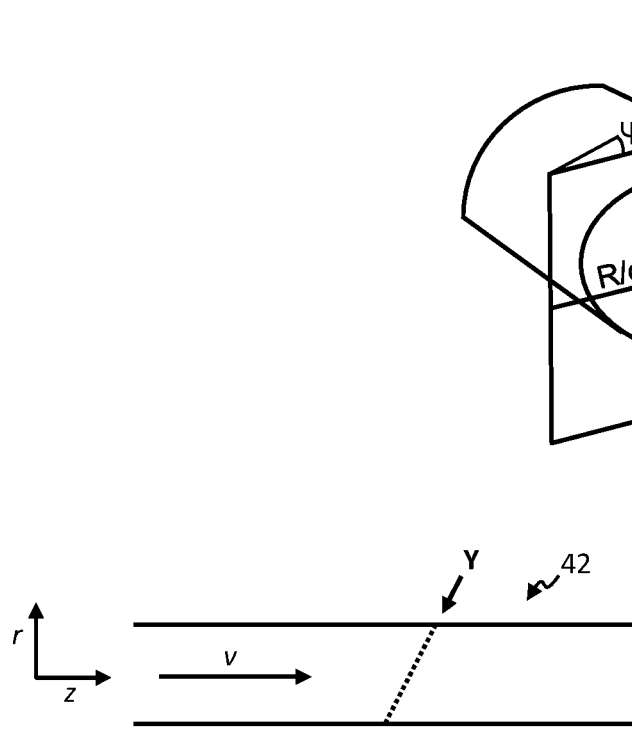
FIG. 13 illustrates projection of an acquired Doppler scan plan onto a plane normal to a direction of flow through the vessel (longitudinal axis of the vessel)
Figure 13:
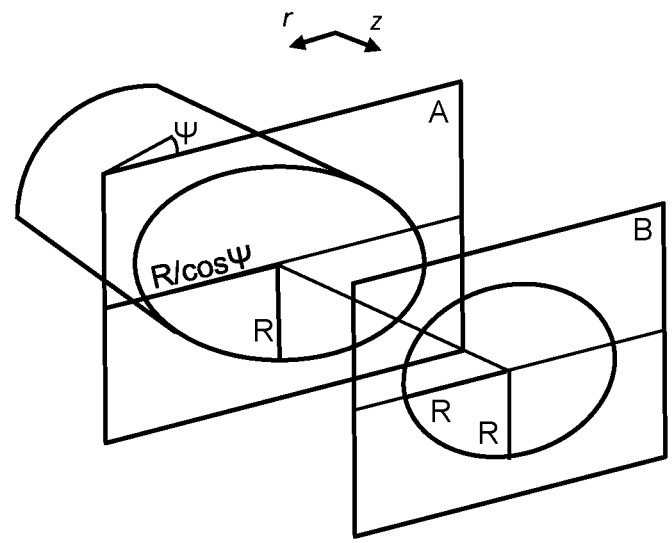

Thus, in some embodiments, deriving the radial velocity profile may comprise: receiving color doppler data spanning a scan plane oriented at an oblique angle with respect to a longitudinal axis of the blood vessel. For example, as illustrated in FIG. 13, a scan plane, A, might be acquired along the direction Y. The method may further comprise deriving a first blood velocity profile as a function of position across said scan plane. The method may then further comprise and computing a projection of the first blood velocity profile to a plane, B, normal to a longitudinal axis of the blood vessel and parallel with a radial axis of the blood vessel, to thereby derive the radial velocity profile corresponding to blood velocity as a function of radial position across a radial axis.

As illustrated in FIG. 13, it is proposed for example to first measure a radial velocity profile along the minor axis of an ellipse which is generated upon slicing the artery at an angle with respect to the longitudinal axis with an ultrasound scanning plane.

To project the velocity profile measured across the elliptical plane, A, onto a plane, B, normal to the vessel long axis, the method comprises estimating an angle, w, of the scan plane with respect to a plane normal to the longitudinal axis. Then, the velocity profile from the oblique plane A can be projected onto the perpendicular plane B by re-sampling the velocity measurements according to the relationship: $V^A(r^A)$ →$V^B(r^B)=V^B(\cos \psi r^A)$, where $V^A$ is the velocity profile measured as a function of radial position, $r^B$, across the radial axis of the angled plane, A, and $V^B$ is the velocity profile measured as a function of radial position, $r^B$, across the plane normal to the vessel longitudinal axis. In other words, if the initial velocity profile, $V^A$, comprises a plurality of blood velocity measurements at a series of radial positions, $r^A$, across a radial axis of the angled plane, then the projection onto the perpendicular plane comprises resampling each velocity measurement $V^A(r^A)$ onto a new measurement sample for the normal plane at $V^B(r^B=\cos \psi r^A)$.

In operation, when acquiring the ultrasound data, color doppler measurements are acquired across a coarse 2D grid of focal zones/points which together define a scan plane. In operation, the ultrasound scanning apparatus may be operated so that this scan plane cuts across the target blood vessel at an oblique angle with respect to the vessel longitudinal axis. The angle of the scan plane can be adjusted manually by an operator manipulating an orientation of the ultrasound transducer unit, or it can be adjusted electronically using beam steering. Then, once the measurement data has been acquired for each of the grid of measurement points, an ellipse is fitted to the color Doppler flow image, and main geometrical parameters of this ellipse (axes, orientation) are identified. The angle, ψ, of the scan plane with respect to a plane normal to the longitudinal axis can be computed based on the lengths of the major axis and minor axis of the ellipse, using the equation:

$$\psi = \cos^{-1}\left(\frac{\text{minor axis}}{\text{major axis}}\right)$$

Then, as discussed above, each velocity measurement point across the scan plane radial axis (e.g., across the major axis of the ellipse) can be mapped to a velocity measurement for the normal plane by multiplying coordinates along the major ellipse axis by cos ψ.

As discussed above, it is proposed to further obtain pulsed wave doppler (PWD) ultrasound data in addition to the color doppler data. Pulsed wave doppler data can be used to derive the blood velocity-time waveform representative of blood velocity at the measurement location of the blood vessel over a time window. Pulsed wave doppler data can typically only be acquired at a single relatively small measurement location, e.g., at a center of the blood vessel. Pulsed wave doppler data is acquired using a smaller aperture (single beam), as compared with color doppler (multiple beams). PWD realizes sampling in a (small) volume with a higher repetition rate (higher sampling frequency) which allows for a superior statistics and higher SNR in the velocity measurements. Thus, PWD represents a trade-off compared to color doppler of higher temporal resolution and SNR, at the cost of smaller spatial sampling area.

As discussed above, it is further proposed to obtain B-mode ultrasound data. This can be used to derive an arterial diameter waveform representative of a diameter of the blood vessel, or a parameter proportional thereto, at the measurement location over the time window. B-mode data comprises a sequence of scan lines acquired across a scan plane. The B-mode scan plane may be the same plane as the color Doppler scan plane. In some embodiments, the B-mode scan plane may be perpendicular to the color doppler scan plane. The B-mode ultrasound data according to this disclosure is thus 2D B-mode ultrasound data.

In some embodiments, triplex-mode ultrasound acquisition is used to acquire the color Doppler data, the pulsed wave doppler data and the B-mode data together in an interleaved fashion across the measurement time window. In triplex mode, color Doppler frames (at lower frame rate) are synchronized with PWD frames, which are at a higher frame rate. The PWD frame interrogates flow velocity and direction along a single scan line at a certain depth (defined by the sample volume or gate). Color flow Doppler simultaneously interrogates multiple sample volumes (with each pixel representing a sample volume) along an array of scan lines.

In some embodiments, the derived radial velocity profile may be modified or adjusted based on the pulsed wave doppler (PWD) data to improve accuracy. As mentioned above, PWD velocity measurement have higher SNR (Signal to Noise Ratio). In some embodiments, a normalization constant may be derived for adjusting each of the velocity measurement points based on at least one PWD-derived velocity measurement.

For example, adjusting the radial velocity profile derived from a color doppler dataset may comprise the following steps. First, a temporally closest PWD velocity measurement to the color Doppler dataset is identified. The PWD velocity measurement will correspond to a particular gate location, e.g., the center of the blood vessel. Then, a normalization constant is derived C_norm=(PWD_gatelocation)/(Color doppler velocity at PWD gate location). For example, if the PWD gate location is the center of the blood vessel, then the color doppler measurement corresponding to this same location is used as the denominator.

Then, each velocity value in the radial velocity profile is multiplied by the normalization constant C_norm to derive an adjusted radial velocity profile.

As discussed above, the method involves computing from the radial velocity profile one or more pre-defined velocity profile parameters, computing from the blood velocity waveform a pre-defined blood velocity parameter, and computing from the arterial diameter waveform a pre-defined arterial diameter parameter. There are different options in relation to the computed blood velocity parameter, arterial diameter parameter and velocity profile parameters, which act as inputs to the transfer function.

With regards to the blood velocity parameter, arterial diameter parameter, and velocity profile parameters, what is meant by these labels is that the parameters are computed or extracted from the blood velocity waveform, arterial diameter waveform and radial velocity profile respectively. In other words, they are a blood velocity-derived parameter and arterial diameter-derived parameter and radial velocity profile-derived parameters. They might instead be referred to as first, second and third parameters for example.

Different options for the radial velocity profile parameters will now be discussed. The purpose of deriving the radial velocity profile parameters is to provide a quantitative representation of the profile in a form that can serve as an input to the transfer function.

Preferably, the extracted features are each representative of a degree of deviation of the velocity profile from a parabolic velocity profile.

Computing the one or more pre-defined velocity profile parameters includes computing a skewness of the velocity profile. This can be computed for example as an absolute difference between an area under a "left" and "right" part of the velocity profile. The left part means the portion of the velocity profile spanning radial position values less than the center position value and the right part means the portion of the velocity profile spanning position values greater than the center position value. In other words, it can be computed as the difference between the respective areas under the velocity profile on either side of the position center point.

In some embodiments, computing the one or more pre-defined velocity profile parameters includes computing a radial location of a velocity maximum of the velocity profile. For example, this may comprise computing a radial position, $\Delta r$, of the velocity maximum with respect to a center line of the vessel. For example, $\Delta r$ is equal to the radial distance of the velocity maximum from the radial center of the vessel. In some embodiments, this might be further normalized by the radius, R, of the vessel, i.e., the one or more pre-defined velocity profile parameters may include a value of $\Delta r/R$.

In some embodiments, computing the one or more pre-defined velocity profile parameters includes computing an area-under-curve of the velocity profile.

In some embodiments, computing the one or more pre-defined velocity profile parameters includes computing a ratio of an area under a left-side of the curve and an area under a right side of the curve, wherein the left side means the portion of the curve to the left of a radial center point of the vessel and a right side of the curve means a portion of the curve to the right of a radial center point of the curve.

In some embodiments, the method comprises deriving a radial velocity profile for a series of time points over the time window, to thereby derive a radial velocity profile as a function of time.

In some embodiments, computing the one or more pre-defined velocity profile parameters includes computing a standard deviation of the radial velocity profile over the time window. In some embodiments, computing the one or more pre-defined velocity profile parameters includes computing a standard deviation of the radial velocity profile over the time window for each time point (i.e., each frame) and then computing an average of the standard deviation values over all of the time points.

The concept in this case is to quantitatively capture changes in the velocity profile over time by assessing the standard deviation of the velocity profile for each frame. This approach may thereby capture turbulent blood flow, including due to arrhythmias.

In some embodiments, the aforementioned time window includes systole phase and a diastole phase. In some embodiments, the computing the one or more pre-defined velocity profile parameters includes computing a difference between the velocity profile at a time point within the systole phase and the velocity profile at a time point within the diastole phase.

The systolic and diastolic phases could be identified in the velocity-time waveform by identifying characteristic waveform features. For example, trough to peak dicrotic notch corresponds to systole and dicrotic notch to subsequent trough corresponds to diastole. In some embodiments, an average of the velocity profile may be computed over the systole phase and an average of the velocity profile may be computed over the diastole phase. These average values might be included in the computed velocity profile parameters.

In some embodiments, as a more general principle, at least one of the one or more pre-defined velocity profile parameters represents a deviation of at least one feature of the velocity profile from a parabolic velocity function.

In some embodiments, computing at least one of the one or more pre-defined velocity profile parameters comprises: extracting a feature from the velocity profile and computing a deviation of the extracted feature from a corresponding feature of a parabolic velocity function.

Figure 14:
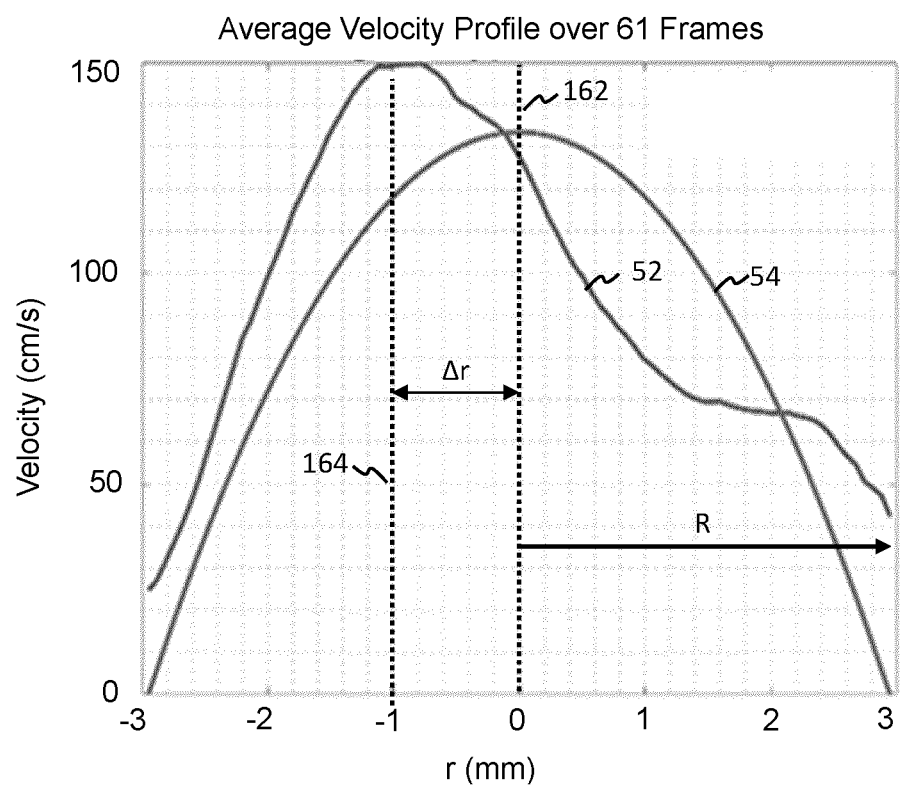
FIG. 14 illustrates comparison of an example blood velocity profile with an ideal parabolic profile for extraction of one or more velocity profile parameters.

By way of illustration, FIG. 14 shows an ideal parabolic radial velocity profile 54 compared against an example measured radial velocity profile 52 over 61 frames in a simulation. Line 162 indicates the radial center of the artery (of radius, R), while line 164 indicates the radial position of the velocity maximum of the measured velocity profile 52. In some embodiments, computing the one or more pre-defined velocity profile parameters might include computing a radial distance, $\Delta r$, between a radial position 164 of the velocity maximum of the measured velocity profile and the radial center 162 of the blood vessel (which corresponds to the radial position of the velocity maximum of a parabolic velocity profile).

This represents just one example. More generally, it is proposed to derive features of the measured radial velocity profile which independently and in conjunction with one another characterize a deviation of the velocity profile from a parabola. These might include, by way of example, any of the features mentioned above. One or more of these features might be provided as inputs to the transfer function. In some embodiments, a difference with respect to values of a corresponding feature of a parabolic velocity profile might be explicitly computed and used as input to the transfer function.

Reference has been made in this document to a parabolic velocity profile. By this this is meant a profile indicative of blood velocity, v, as a function of position, r, across the blood vessel cross section which has the form a parabolic function, e.g.

$$v(x) = b_0 + b_1 r + b_2 r^2$$

where $b_2$ is generally negative because blood velocity is generally maximum near a center of the vessel, and where $b_0$ may be equal to the maximum blood velocity value across the vessel.

With regards to the velocity parameter and diameter parameter, different options will now be discussed, with reference to Table 2 below which lists a variety of different possible options for these parameters. Parameters 1 and 3-6 are examples of the velocity parameter, and parameters 2 and 7 are examples for the diameter parameter.

TABLE 2

| ID | Parameter Name | Parameter description | Details; Units |
|---|---|---|---|
| 1 | PSV | Peak systolic velocity | Mean of the PSVs in the time window; cm/s |
| 2 | Dia | Diameter | Mean diameter over the time window; cm |
| 3 | VTINormPerBeat | Area under the velocity waveform (velocity-time integral) normalized by the number of heart cycles spanned by the time window | cm/beat |
| 4 | meanVelNormPerBeat | Mean value of the velocity waveform normalized by the number of heart cycles spanned by the time window | cm/s/beat |
| 5 | meanVelWave | Mean value of the velocity waveform | cm/s |
| 6 | IDRVelWave | Interdecile range of the velocity waveform | cm/s |
| 7 | CSArea | Mean Cross-sectional area of the artery | Derived from diameter by assuming circular cross-section; $cm^2$ |

With regards to the blood velocity parameter, by way of a non-limiting set of examples, this may be any one or more of:
- an interdecile range of the velocity waveform over the time window (IDR VelWave in Table 2);
- a mean value of blood velocity over the time window (mean VelWave in Table 2);
- a mean value of peak systolic velocity over the time window (PSV in Table 2);
- a mean value of the blood velocity over the time window, normalized by a number of heart cycles spanned by the time window (mean VelNormPerBeat in Table 2);
- an integral of the velocity waveform with respect to time over the time window, normalized by the number of heart cycles spanned by the time window (VTINormPerBeat in Table 2).

In some embodiments, a combination or two or more of these parameters may be used as inputs to the transfer function.

With regards to the arterial diameter parameter, this may, according to a non-limiting set of examples, be one or more of:
- a mean value of the arterial diameter over the time window (Dia in Table 2);
- a mean value of a cross-sectional area of the at least one blood vessel over the time window (CSArea in Table 2).

In some embodiments, the transfer function may be adapted to receive as a further input one or more demographic features of the subject, for example age, gender and/or body mass index (BMI).

Table 2 provides a summary of one non-limiting set of example parameters, some or all of which may be selected as the inputs to be obtained and provided to the transfer function in order to derive the one or more hemodynamic parameters.

With regards to the derived one or more hemodynamic parameters, these may include, by way of non-limiting example, one or more of: cardiac output, stroke volume, and stroke volume variation.

In some embodiments, the method may further comprise obtaining at least one pre-defined further parameter for the subject over the time window, and wherein the transfer function is further configured to receive said pre-defined further parameter for the subject as a further input (in addition to the first set of parameters 70, 72, 74 already discussed above).

By way of non-limiting example, Table 3 below lists a set of example pre-defined further parameters which might be used in this context. The table presents these in summary before further explanation to follow.

TABLE 3

| ID | Parameter Name | Parameter description | Details; Units |
|----|----------------|----------------------|----------------|
| 1 | ArtSVNormperBeat | Area under the arterial stroke volume (SV) waveform normalized by the number of heart cycles spanned by the time window | ml (SV/beat) |
| 2 | meanArtSVWaveNormPerBeat | Mean of the arterial SV waveform normalized by the number of heart cycles spanned by the time window | ml/beat |
| 3 | meanArtSVWave | Mean of the arterial SV waveform. | ml |
| 4 | HR | Mean Heart rate, e.g. derived from the US velocity waveform | bpm |
| 5 | meanArtFlow | Mean of the arterial flow waveform | Velocity waveform multiplied by the Cross-sectional area (waveform); ml/s |
| 6 | ArtFlowVTIArea | Equivalent of arterial flow estimated by multiplying velocity-time integral (VTI) waveform by cross-sectional area divided by length of time window. | ml/s |
| 7 | ArtFlowPSVArea | Equivalent of arterial flow estimated by multiplying PSV by cross-sectional area divided by length of time window. | PSV is not continuous, rather it resets upon each heartbeat; $ml/s^2$ |

In particular, with regards to the at least one further parameter, this may in some examples include a heart rate of the subject (HR in Table 3). In some embodiments, the method may comprise receiving Doppler ultrasound data of the at least one blood vessel and processing the Doppler ultrasound data to derive a measure of the heart rate of the subject.

In some examples, the at least one further parameter may include a parameter derived from processing of a stroke volume waveform. For example, the method may comprise processing the velocity waveform and the arterial diameter waveform to derive an arterial stroke volume waveform. The arterial stroke volume waveform can be computed by processing the velocity waveform to derive an area under the waveform over a single heart cycle (e.g., through computation of a velocity-time integral of the waveform over a single complete heart cycle), and processing the diameter waveform to derive a cross-sectional area waveform over the same heart cycle. The stroke volume waveform may be derived based on said area under the velocity waveform and based on the cross-sectional area waveform.

By way of one example, the at least one further parameter may include an area under the arterial stroke volume waveform over the time window, normalized by a number of heart cycles spanned by the time window (ArtSVNormperBeat in Table 3 above).

Additionally or alternatively, the at least one further parameter may include a mean of the arterial stroke volume waveform over the time window, optionally normalized by a number of heart cycles spanned by the time window (meanArtSVWaveNormPerBeat and meanArtSVWave respectively in Table 3 above).

In some examples, the at least one further parameter may include a mean arterial blood flow value for the time window (volume flow per unit time). This corresponds to meanArtFlow in Table 3 above. This may be computed by processing the arterial diameter waveform to derive an arterial cross-sectional area waveform for the time window; deriving an arterial blood flow waveform for the time window based on computing a product of the velocity waveform and the arterial cross-sectional area waveform; and processing the arterial flow waveform to derive a mean arterial flow value over the time window.

In some examples, the at least one further physiological parameter may include one or more vital signs, for example: heart rate, respiration rate, and/or blood pressure. In some examples, these may be obtained from sensor signals received from one or more physiological parameter sensors.

Thus, above has been described a process for obtaining a first set of parameters which include: one or more pre-defined velocity profile parameters; at least one pre-defined blood velocity parameter; and at least one pre-defined arterial diameter parameter. As mentioned, optionally, at least one further parameter may be derived and used as an additional input to the transfer function, but this is optional.

As discussed above, the method further comprises retrieving a pre-defined transfer function configured to receive at least said first set of parameters as inputs and to generate the one or more hemodynamic parameters as output, and processing the first set of parameters with the transfer function to derive values for the one or more hemodynamic parameters.

According to some embodiments, the processing of the parameters to derive the one or more hemodynamic parameters may be performed using a machine learning model comprising one or more machine learning algorithms which have been trained to map a pre-defined set of input parameters to a set of one or more hemodynamic parameters.

A machine-learning algorithm is any self-training algorithm that processes input data in order to produce or predict output data. Here, the input data comprises at least the blood velocity parameter, arterial diameter parameter, and the one or more velocity profile parameters (i.e., the first set of parameters), and the output data comprises the one or more hemodynamic parameters. Optionally, the input data might additionally comprise one or more of the further parameters discussed in relation to Table 3 above.

Suitable machine-learning algorithms for being employed in the present invention will be apparent to the skilled person. Examples of suitable machine-learning algorithms include linear regression algorithms, decision tree algorithms and artificial neural networks. Other machine-learning algorithms such as logistic regression, support vector machines or Naïve Bayesian models are suitable alternatives.

In examples presented below, a machine learning algorithm in the form of a multi-parametric linear regression model is used to demonstrate the principles of the inventive concept. However, it is to be understood that, in each example, the machine learning model may be replaced by a different type of machine learning model without impact on the advantages technical effects.

With regards in particular to a multi-parametric linear regression model, the model is established by first constructing a model or algorithm which incorporates each of the desired input parameters as an (independent variable) parameter of the model, with a corresponding coefficient or weighting, and secondly training the constructed model based on a training dataset to thereby fit the model coefficients or weightings so as to provide a best fit between the input parameters of the training dataset and the corresponding output parameters of the training dataset. The desired input parameters form the independent variables of the model, while the target hemodynamic parameter is the dependent variable of the model. The model represents the relevant hemodynamic parameter being estimated as being a linear sum of a constant term (the intercept), and each of the dependent variables multiplied by a respective weighting or coefficient.

The training dataset will comprise training input data entries and corresponding training output data entries. The training input data entries in this case correspond to example values of the pre-selected blood velocity parameter, arterial diameter parameter, and one or more velocity profile parameters. Optionally, the training input data entries might additionally include one or more of the further parameters discussed in relation to Table 3 above. The training output data entries correspond to pre-determined one or more hemodynamic parameters.

An initialized machine-learning algorithm is applied to each input data entry to generate predicted output data entries. An error between the predicted output data entries and corresponding training output data entries is used to modify the machine-learning algorithm. This process can be repeated until the error converges, and the predicted output data entries are sufficiently similar (e.g. +1%) to the training output data entries. This is commonly known as a supervised learning technique.

For a multiparametric regression model, the training process is a process of fitting the model weightings/coefficients to the training dataset. Once the training or fitting process is complete, the model can be deployed using the weightings or coefficients obtained in the training or fitting process to map input parameters (independent variables) to the output hemodynamic parameter.

The performance or accuracy of a generated machine learning model can be assessed by running the model on a test dataset after training, and assessing the error between the output predicted values generated by the model and the actual ground truth values. For example, for a linear regression model, the performance measurements can include a goodness-of-fit of linear regression (R2), the root mean square error (RMSE) obtained from a correlation scatter plot as well as the coefficient of reproducibility (rpc) obtained from a Bland-Altman plot.

In accordance with one or more embodiments, the method may further comprise deriving a measure of blood flow based on use of the radial velocity profile whose derivation has been discussed above.

In some embodiments, the method may comprise generating a real-time instantaneous flow signal which represents a measure of instantaneous blood flow at the measurement location as a function of time. In the context of this disclosure, flow means the volume of fluid flowing past a measurement point per unit time.

Determining a measure of blood flow from Doppler data in general involves computing a blood velocity value for a measurement location and then multiplying this value by a value of a cross-sectional area of the blood vessel at the measurement location. This then provides an estimated measure of blood volume flowing across the measurement location per unit time.

If only PWD data are acquired, then only a single velocity value is obtained at the measurement location and this may then be multiplied by the cross-sectional area, or an estimated average velocity value is computed from the PWD measurement based on an assumed parabolic velocity profile, and this average value is multiplied by the cross-sectional area.

In the context of the methods of the present invention, the derived radial velocity profile provides a way of obtaining a more accurate estimate of average velocity through the vessel (meaning average velocity across the vessel radial cross-section). In particular, according to one or more embodiments it is proposed to: compute and store a radial velocity profile in the manner already discussed above; receive real-time PWD data for a gate location in the blood vessel, e.g., a center of the blood vessel; retrieve the stored radial velocity profile; scale the velocity profile based on the instantaneous PWD velocity measurement; compute an average velocity across the vessel diameter using the radial velocity profile (i.e., taking an average of the velocity values of the velocity profile); and computing an average instantaneous flow by multiplying the computed average velocity with a measure of vessel cross-sectional area at the measurement location. The cross-sectional area can be computed from the measured vessel diameter, obtained from the B-mode data as discussed above.

In some embodiments, multiple radial velocity profiles might be stored, for example one for each of a plurality of time points spanning at least one heart cycle. In some embodiments, the particular velocity profile which is retrieved may be determined based on the instantaneous phase of the heart cycle. Since the radial velocity profile may change at different points throughout the heart cycle, this improves accuracy of instantaneous flow measures.

In some embodiments, the stored radial velocity profile might be updated regularly, for example it might be updated for each new color doppler frame which is acquired. If multiple profiles are stored corresponding to different phase points of the heart cycle, each may be updated for each new color doppler frame acquired for a corresponding phase point of the heart cycle.

In some embodiments, a transfer function could be defined which permits mapping between an acquired PWD velocity measurement at a pre-defined gate location and an estimated radial velocity profile. There may be a different transfer function for each of a plurality of heart cycle phase points.

The reference above to scaling of the velocity profile based on the instantaneous PWD measurement may be understood as follows. The aim is to maintain the shape or morphology of the profile, but adjust the absolute values so that measured PWD value at the PWD gate location in the artery matches the velocity value indicated by the scaled profile at that same gate location.

In some embodiments, an average flow value for each heart cycle may be computed. This can be achieved by performing the above-described process for each color doppler frame acquired across a heart cycle, i.e., for each of a series of time points spanning a heart cycle. An average flow value for each heart cycle can be computed by taking the average of the instantaneous flow values computed in the manner described above for each scaled color doppler frame over each heart cycle. The radial velocity profile can vary as a function of changing flow. Thus, by taking an average over multiple time points spanning a heart cycle, a more accurate flow value can be computed.

For implementing this feature, preferably a frame rate of color Doppler data acquisition is set at a value greater than 10 frames per heart beat. Additionally or alternatively, in some embodiments at least one radial velocity profile may be computed for the systole phase and at least one radial velocity profile computed for the diastole phase, and wherein the average flow over a heart cycle can be computed in the manner described above using at least these two velocity profiles.

As noted above, methods according to embodiments of the present invention may find advantageous application for continuous or ongoing monitoring of hemodynamics of a subject. The method may comprise generating a data output indicative of the estimated one or more hemodynamic parameters generated by the model and transmitting the data output to a patient monitor system, and wherein the patient monitor system comprises a display device and is adapted to display a visual representation of the derived one or more hemodynamic parameters on the display device. The patient monitor system may additionally or alternatively store or cache the derived hemodynamic parameters, either locally or remotely. It may export the parameters to a remote system, e.g., an institution network or server.

In accordance with a further aspect of the invention, there is provided a method of providing a machine learning model for deriving one or more hemodynamic parameters. The method comprises generating an initial machine learning model adapted to receive a pre-defined set of parameters as inputs, and to process said received parameters to generate an estimate of one or more hemodynamic parameters. The pre-defined set of input parameters include: a parameter computed from a blood velocity-time waveform representative of blood velocity at a measurement location of at least one blood vessel over a time window; a parameter extracted from an arterial diameter-time waveform representative of a diameter of said at least one blood vessel at the measurement location over the time window; and one or more parameters derived from a radial velocity profile representative of blood velocity as a function of position across a radial axis of the blood vessel at a measurement location.

The method further comprises providing a training dataset comprising a plurality of training input data entries and a corresponding plurality of training output data entries, the training input data entries each comprising values for each of the set of pre-defined input parameters, and the training output data entries each comprising corresponding values for the one or more hemodynamic parameters.

The method further comprises applying the machine learning algorithm to the training input data entries and adjusting internal parameters of the machine learning model to minimize error between the generated outputs of the model and the training output data entries.

As noted above, certain embodiments may include an ultrasound scanning apparatus 92, and/or means for processing ultrasound echo data to derive further data.

Figure 15:
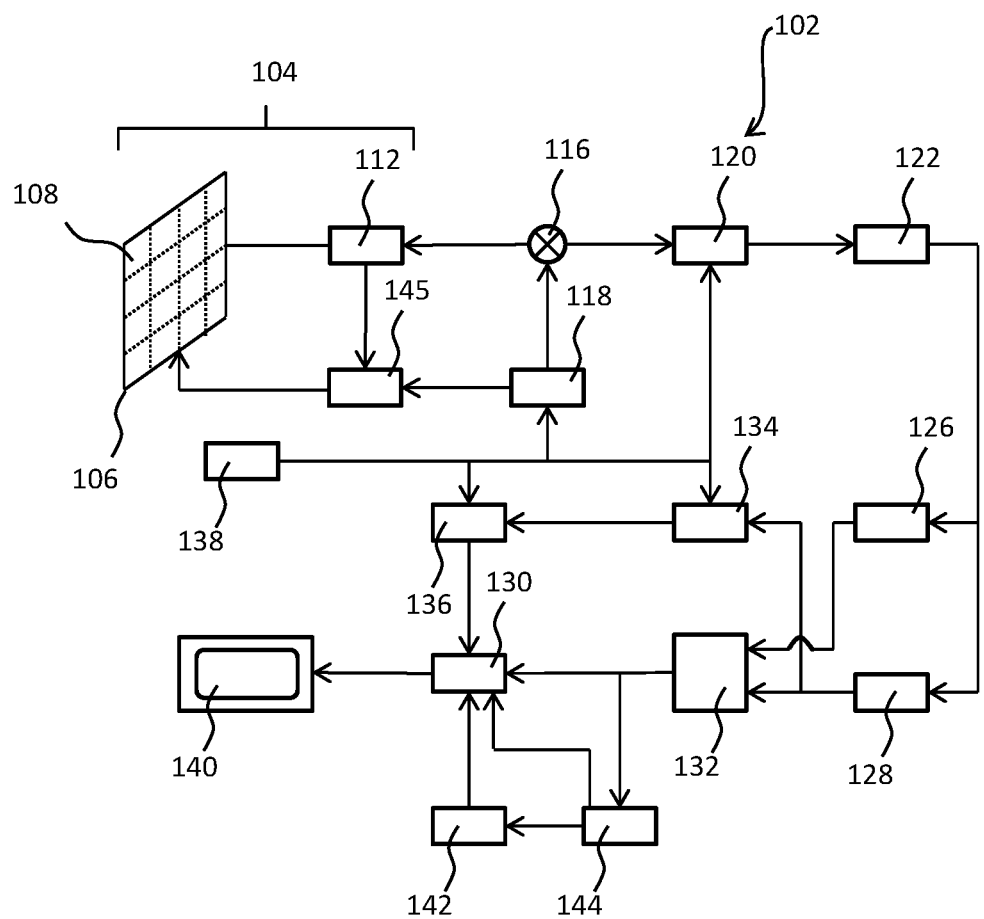
FIG. 15 outlines the architecture of an example ultrasound system.

By way of further, more detailed explanation, the general operation of an exemplary ultrasound system will now be described, with reference to FIG. 15.

The system comprises an array transducer probe 104 which has a transducer array 106 for transmitting ultrasound waves and receiving echo information. The transducer array 106 may comprise CMUT transducers; piezoelectric transducers, formed of materials such as PZT or PVDF; or any other suitable transducer technology. In this example, the transducer array 106 is a two-dimensional array of transducers 108 capable of scanning either a 2D plane or a three-dimensional volume of a region of interest. In another example, the transducer array may be a 1D array.

The transducer array 106 is coupled to a microbeamformer 112 which controls reception of signals by the transducer elements. Microbeamformers are capable of at least partial beamforming of the signals received by sub-arrays, generally referred to as "groups" or "patches", of transducers as described in U.S. Pat. No. 5,997,479 (Savord et al.), U.S. Pat. No. 6,013,032 (Savord), and U.S. Pat. No. 6,623,432 (Powers et al.).

It should be noted that the microbeamformer is in general entirely optional. Further, the system includes a transmit/receive (T/R) switch 116, which the microbeamformer 112 can be coupled to and which switches the array between transmission and reception modes, and protects the main beamformer 120 from high energy transmit signals in the case where a microbeamformer is not used and the transducer array is operated directly by the main system beamformer. The transmission of ultrasound beams from the transducer array 106 is directed by a transducer controller 118 coupled to the microbeamformer by the T/R switch 116 and a main transmission beamformer (not shown), which can receive input from the user's operation of the user interface or control panel 138. The controller 118 can include transmission circuitry arranged to drive the transducer elements of the array 106 (either directly or via a microbeamformer) during the transmission mode.

The function of the control panel 138 in this example system may be facilitated by an ultrasound controller unit according to an embodiment of the invention.

In a typical line-by-line imaging sequence, the beamforming system within the probe may operate as follows. During transmission, the beamformer (which may be the microbeamformer or the main system beamformer depending upon the implementation) activates the transducer array, or a sub-aperture of the transducer array. The sub-aperture may be a one-dimensional line of transducers or a two dimensional patch of transducers within the larger array. In transmit mode, the focusing and steering of the ultrasound beam generated by the array, or a sub-aperture of the array, are controlled as described below.

Upon receiving the backscattered echo signals from the subject, the received signals undergo receive beamforming (as described below), in order to align the received signals, and, in the case where a sub-aperture is being used, the sub-aperture is then shifted, for example by one transducer element. The shifted sub-aperture is then activated, and the process repeated until all of the transducer elements of the transducer array have been activated.

For each line (or sub-aperture), the total received signal, used to form an associated line of the final ultrasound image, will be a sum of the voltage signals measured by the transducer elements of the given sub-aperture during the receive period. The resulting line signals, following the beamforming process below, are typically referred to as radio frequency (RF) data. Each line signal (RF data set) generated by the various sub-apertures then undergoes additional processing to generate the lines of the final ultrasound image. The change in amplitude of the line signal with time will contribute to the change in brightness of the ultrasound image with depth, wherein a high amplitude peak will correspond to a bright pixel (or collection of pixels) in the final image. A peak appearing near the beginning of the line signal will represent an echo from a shallow structure, whereas peaks appearing progressively later in the line signal will represent echoes from structures at increasing depths within the subject.

One of the functions controlled by the transducer controller 118 is the direction in which beams are steered and focused. Beams may be steered straight ahead from (orthogonal to) the transducer array, or at different angles for a wider field of view. The steering and focusing of the transmit beam may be controlled as a function of transducer element actuation time.

Two methods can be distinguished in general ultrasound data acquisition: plane wave imaging and "beam steered" imaging. The two methods are distinguished by a presence of the beamforming in the transmission ("beam steered" imaging) and/or reception modes (plane wave imaging and "beam steered" imaging).

Looking first to the focusing function, by activating all of the transducer elements at the same time, the transducer array generates a plane wave that diverges as it travels through the subject. In this case, the beam of ultrasonic waves remains unfocused. By introducing a position dependent time delay to the activation of the transducers, it is possible to cause the wave front of the beam to converge at a desired point, referred to as the focal zone. The focal zone is defined as the point at which the lateral beam width is less than half the transmit beam width. In this way, the lateral resolution of the final ultrasound image is improved.

For example, if the time delay causes the transducer elements to activate in a series, beginning with the outermost elements and finishing at the central element(s) of the transducer array, a focal zone would be formed at a given distance away from the probe, in line with the central element(s). The distance of the focal zone from the probe will vary depending on the time delay between each subsequent round of transducer element activations. After the beam passes the focal zone, it will begin to diverge, forming the far field imaging region. It should be noted that for focal zones located close to the transducer array, the ultrasound beam will diverge quickly in the far field leading to beam width artifacts in the final image. Typically, the near field, located between the transducer array and the focal zone, shows little detail due to the large overlap in ultrasound beams. Thus, varying the location of the focal zone can lead to significant changes in the quality of the final image.

It should be noted that, in transmit mode, only one focus may be defined unless the ultrasound image is divided into multiple focal zones (each of which may have a different transmit focus).

In addition, upon receiving the echo signals from within the subject, it is possible to perform the inverse of the above-described process in order to perform receive focusing. In other words, the incoming signals may be received by the transducer elements and subject to an electronic time delay before being passed into the system for signal processing. The simplest example of this is referred to as delay-and-sum beamforming. It is possible to dynamically adjust the receive focusing of the transducer array as a function of time.

Looking now to the function of beam steering, through the correct application of time delays to the transducer elements it is possible to impart a desired angle on the ultrasound beam as it leaves the transducer array. For example, by activating a transducer on a first side of the transducer array followed by the remaining transducers in a sequence ending at the opposite side of the array, the wave front of the beam will be angled toward the second side. The size of the steering angle relative to the normal of the transducer array is dependent on the size of the time delay between subsequent transducer element activations.

Further, it is possible to focus a steered beam, wherein the total time delay applied to each transducer element is a sum of both the focusing and steering time delays. In this case, the transducer array is referred to as a phased array.

In case of the CMUT transducers, which require a DC bias voltage for their activation, the transducer controller 118 can be coupled to control a DC bias control 145 for the transducer array. The DC bias control 145 sets DC bias voltage(s) that are applied to the CMUT transducer elements.

For each transducer element of the transducer array, analog ultrasound signals, typically referred to as channel data, enter the system by way of the reception channel. In the reception channel, partially beamformed signals are produced from the channel data by the microbeamformer 112 and are then passed to a main receive beamformer 120 where the partially beamformed signals from individual patches of transducers are combined into a fully beamformed signal, referred to as radio frequency (RF) data. The beamforming performed at each stage may be carried out as described above, or may include additional functions. For example, the main beamformer 120 may have 128 channels, each of which receives a partially beamformed signal from a patch of dozens or hundreds of transducer elements. In this way, the signals received by thousands of transducers of a transducer array can contribute efficiently to a single beamformed signal.

The beamformed reception signals are coupled to a signal processor 122. The signal processor 122 can process the received echo signals in various ways, such as: band-pass filtering; decimation; I and Q component separation; and harmonic signal separation, which acts to separate linear and nonlinear signals so as to enable the identification of nonlinear (higher harmonics of the fundamental frequency) echo signals returned from tissue and micro-bubbles. The signal processor may also perform additional signal enhancement such as speckle reduction, signal compounding, and noise elimination. The band-pass filter in the signal processor can be a tracking filter, with its pass band sliding from a higher frequency band to a lower frequency band as echo signals are received from increasing depths, thereby rejecting noise at higher frequencies from greater depths that is typically devoid of anatomical information.

The beamformers for transmission and for reception are implemented in different hardware and can have different functions. Of course, the receiver beamformer is designed to take into account the characteristics of the transmission beamformer. In FIG. 15 only the receiver beamformers 112, 120 are shown, for simplicity. In the complete system, there will also be a transmission chain with a transmission micro beamformer, and a main transmission beamformer.

The function of the micro beamformer 112 is to provide an initial combination of signals in order to decrease the number of analog signal paths. This is typically performed in the analog domain.

The final beamforming is done in the main beamformer 120 and is typically after digitization.

The transmission and reception channels use the same transducer array 106 which has a fixed frequency band. However, the bandwidth that the transmission pulses occupy can vary depending on the transmission beamforming used. The reception channel can capture the whole transducer bandwidth (which is the classic approach) or, by using bandpass processing, it can extract only the bandwidth that contains the desired information (e.g. the harmonics of the main harmonic).

The RF signals may then be coupled to a B mode (i.e. brightness mode, or 2D imaging mode) processor 126 and a Doppler processor 128. The B mode processor 126 performs amplitude detection on the received ultrasound signal for the imaging of structures in the body, such as organ tissue and blood vessels. In the case of line-by-line imaging, each line (beam) is represented by an associated RF signal, the amplitude of which is used to generate a brightness value to be assigned to a pixel in the B mode image. The exact location of the pixel within the image is determined by the location of the associated amplitude measurement along the RF signal and the line (beam) number of the RF signal. B mode images of such structures may be formed in the harmonic or fundamental image mode, or a combination of both as described in U.S. Pat. No. 6,283,919 (Roundhill et al.) and U.S. Pat. No. 6,458,083 (Jago et al.) The Doppler processor 128 processes temporally distinct signals arising from tissue movement and blood flow for the detection of moving substances, such as the flow of blood cells in the image field. The Doppler processor 128 typically includes a wall filter with parameters set to pass or reject echoes returned from selected types of materials in the body.

The structural and motion signals produced by the B mode and Doppler processors are coupled to a scan converter 132 and a multi-planar reformatter 144. The scan converter 132 arranges the echo signals in the spatial relationship from which they were received in a desired image format. In other words, the scan converter acts to convert the RF data from a cylindrical coordinate system to a Cartesian coordinate system appropriate for displaying an ultrasound image on an image display 140. In the case of B mode imaging, the brightness of pixel at a given coordinate is proportional to the amplitude of the RF signal received from that location. For instance, the scan converter may arrange the echo signal into a two-dimensional (2D) sector-shaped format, or a pyramidal three-dimensional (3D) image. The scan converter can overlay a B mode structural image with colors corresponding to motion at points in the image field, where the Doppler-estimated velocities to produce a given color. The combined B mode structural image and color Doppler image depicts the motion of tissue and blood flow within the structural image field. The multi-planar reformatter will convert echoes that are received from points in a common plane in a volumetric region of the body into an ultrasound image of that plane, as described in U.S. Pat. No. 6,443,896 (Detmer). A volume renderer 142 converts the echo signals of a 3D data set into a projected 3D image as viewed from a given reference point as described in U.S. Pat. No. 6,530,885 (Entrekin et al.).

The 2D or 3D images are coupled from the scan converter 132, multi-planar reformatter 144, and volume renderer 142 to an image processor 130 for further enhancement, buffering and temporary storage for optional display on an image display 140. The imaging processor may be adapted to remove certain imaging artifacts from the final ultrasound image, such as: acoustic shadowing, for example caused by a strong attenuator or refraction; posterior enhancement, for example caused by a weak attenuator; reverberation artifacts, for example where highly reflective tissue interfaces are located in close proximity; and so on. In addition, the image processor may be adapted to handle certain speckle reduction functions, in order to improve the contrast of the final ultrasound image.

In addition to being used for imaging, the blood flow values produced by the Doppler processor 128 and tissue structure information produced by the B mode processor 126 are coupled to a quantification processor 134. The quantification processor produces measures of different flow conditions such as the volume rate of blood flow in addition to structural measurements such as the sizes of organs and gestational age. The quantification processor may receive input from the user control panel 138, such as the point in the anatomy of an image where a measurement is to be made.

Output data from the quantification processor is coupled to a graphics processor 136 for the reproduction of measurement graphics and values with the image on the display 140, and for audio output from the display device 140. The graphics processor 136 can also generate graphic overlays for display with the ultrasound images. These graphic overlays can contain standard identifying information such as patient name, date and time of the image, imaging parameters, and the like. For these purposes the graphics processor receives input from the user interface 138, such as patient name. The user interface is also coupled to the transmit controller 118 to control the generation of ultrasound signals from the transducer array 106 and hence the images produced by the transducer array and the ultrasound system. The transmit control function of the controller 118 is only one of the functions performed. The controller 118 also takes account of the mode of operation (given by the user) and the corresponding required transmitter configuration and bandpass configuration in the receiver analog to digital converter. The controller 118 can be a state machine with fixed states.

The user interface is also coupled to the multi-planar reformatter 144 for selection and control of the planes of multiple multi-planar reformatted (MPR) images which may be used to perform quantified measures in the image field of the MPR images.

The above-described ultrasound system may be operatively coupled with the processing arrangement 82 previously described. The processing arrangement may receive Doppler ultrasound data and spatial ultrasound data (e.g., B-mode) from the above-described ultrasound system. For example, the above-described ultrasound system may be used to implement the ultrasound scanning apparatus 92 of the system 80 shown in FIG. 10 in some examples.

Embodiments of the invention described above employ a processing device. The processing device may in general comprise a single processor or a plurality of processors. It may be located in a single containing device, structure or unit, or it may be distributed between a plurality of different devices, structures or units. Reference therefore to the processing device being adapted or configured to perform a particular step or task may correspond to that step or task being performed by any one or more of a plurality of processing components, either alone or in combination. The skilled person will understand how such a distributed processing device can be implemented. The processing device includes a communication module or input/output for receiving data and outputting data to further components.

The one or more processors of the processing device can be implemented in numerous ways, with software and/or hardware, to perform the various functions required. A processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more (non-transitory) storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller, may be transportable or may be available on-demand (e.g., via the cloud), such that the one or more programs stored thereon can be loaded into a processor or controller.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable (non-transitory) computer readable medium, such as an optical storage medium or a solid-state medium supplied together with or as part of other hardware, but may alternatively be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

What is claimed is:

1. A computer implemented method for deriving one or more hemodynamic parameters of a subject, the method comprising:

receiving 2D ultrasound data from a blood vessel of the subject, wherein said 2D ultrasound data includes B-Mode data, pulsed wave Doppler data and Color Doppler data;

deriving using the received Color Doppler data a radial velocity profile for the blood vessel, the radial velocity profile corresponding to blood velocity as a function of radial position across a radial axis of the blood vessel at a measurement location;

deriving from the received 2D ultrasound data a blood velocity-time waveform representative of blood velocity at the measurement location of the blood vessel over a time window;

deriving from the received 2D ultrasound data an arterial diameter waveform representative of a diameter of said at least one blood vessel, or a parameter proportional thereto, at the measurement location over the time window;

computing a first set of parameters, including:
  computing from the radial velocity profile one or more pre-defined velocity profile parameters, wherein computing the one or more pre-defined velocity profile parameters includes computing at least a skewness of the velocity profile;
  computing from the blood velocity waveform a pre-defined blood velocity parameter; and
  computing from the arterial diameter waveform a pre-defined arterial diameter parameter;

retrieving a pre-defined transfer function configured to receive said first set of parameters as inputs and to generate the one or more hemodynamic parameters as output; and processing the first set of parameters with the transfer function to derive values for the one or more hemodynamic parameters.

2. The method of claim 1, wherein computing the one or more pre-defined velocity profile parameters further includes computing one or more of: (i) radial location of a velocity maximum of the velocity profile, (ii) an area-under-curve of the velocity profile.

3. The method of claim 1, wherein the method comprises deriving a radial velocity profile for a series of time points over the time window, to thereby derive a radial velocity profile as a function of time.

4. The method of claim 3, wherein computing the one or more pre-defined velocity profile parameters includes computing a standard deviation of the radial velocity profile over the time window.

5. The method of claim 3, wherein the time window includes a systole phase and a diastole phase of the subject's heart cycle, and wherein computing the one or more pre-defined velocity profile parameters includes computing a difference between the velocity profile at a time point within the systole phase and the velocity profile at a time point within the diastole phase.

6. The method of claim 1, wherein at least one of the one or more pre-defined velocity profile parameters represents a deviation of at least one feature of the velocity profile from a parabolic velocity function.

7. The method of claim 6, wherein computing at least one of the one or more pre-defined velocity profile parameters comprises: extracting a feature from the velocity profile and computing a deviation of the extracted feature from a corresponding feature of a parabolic velocity function.

8. The method of claim 1, wherein the blood velocity parameter comprises at least one of:
  an interdecile range of the velocity-time waveform over the time window;
  a mean value of blood velocity over the time window;
  a mean value of peak systolic velocity over the time window;
  a mean value of the blood velocity over the time window, normalized by a number of heart cycles spanned by the time window;
  an integral of the velocity-time waveform with respect to time over the time window, normalized by the number of heart cycles spanned by the time window.

9. The method of claim 1, wherein the arterial diameter parameter comprises at least one of:
  a mean value of the arterial diameter over the time window;
  a mean value of a cross-sectional area of the at least one blood vessel over the time window.

10. The method of claim 1, wherein deriving the radial velocity profile comprises:
  receiving color doppler data spanning a scan plane oriented at an oblique angle with respect to a longitudinal axis of the blood vessel;
  deriving a first blood velocity profile as a function of position across said scan plane; and
  computing a projection of the first blood velocity profile to a plane normal to a longitudinal axis of the blood vessel and parallel with a radial axis of the blood vessel, to thereby derive the radial velocity profile corresponding to blood velocity as a function of radial position across a radial axis.

11. The method of claim 1, wherein the one or more hemodynamic parameters include one or more of: cardiac output, stroke volume, and stroke volume variation.

12. The method of claim 1, wherein:
  the transfer function is a machine learning model; and/or
  the transfer function is a linear regression model.

13. A computer program product embodied in a non-transitory computer readable medium and comprising instructions, which, when executed by a suitable computer or processor, cause the computer or processor to perform the method as claimed in claim 1.

14. A processing device comprising:
  an input/output; and
  one or more processors, adapted to carry out the steps of claim 1 and generate a data output indicative of the one or more hemodynamic parameters.

15. A system comprising:
  the processing device of claim 14; and
  an ultrasound scanning apparatus comprising at least one transducer unit for acquiring ultrasound echo signal data of the at least one blood vessel of the subject, and a processing unit for processing the echo data to derive B-Mode data, pulsed wave Doppler data and Color Doppler data;
  wherein the input/output of the processing device is operatively coupled with an output of the ultrasound scanning apparatus for receiving the B-Mode data, pulsed wave Doppler data and Color Doppler data.

* * * * *